US012689824B2

(12) United States Patent
Xu

(10) Patent No.: US 12,689,824 B2
(45) Date of Patent: Jul. 21, 2026

(54) MULTI-CAMERA STRATEGY SCHEDULING METHOD AND RELATED DEVICE THEREOF

(71) Applicant: HONOR DEVICE CO., LTD., Shenzhen (CN)

(72) Inventor: Jirun Xu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 244 days.

(21) Appl. No.: 18/572,277

(22) PCT Filed: Dec. 28, 2022

(86) PCT No.: PCT/CN2022/142843
§ 371 (c)(1),
(2) Date: Dec. 20, 2023

(87) PCT Pub. No.: WO2023/160223
PCT Pub. Date: Aug. 31, 2023

(65) Prior Publication Data
US 2024/0292096 A1 Aug. 29, 2024

(30) Foreign Application Priority Data
Feb. 28, 2022 (CN) .......................... 202210193105.8

(51) Int. Cl.
*H04N 23/60* (2023.01)
*H04N 23/63* (2023.01)
(Continued)

(52) U.S. Cl.
CPC ......... *H04N 23/665* (2023.01); *H04N 23/632* (2023.01); *H04N 23/667* (2023.01); *H04N 23/69* (2023.01)

(58) Field of Classification Search
CPC .. H04N 23/665; H04N 23/632; H04N 23/667; H04N 23/69; H04N 23/67
See application file for complete search history.

(56) References Cited

U.S. PATENT DOCUMENTS

2016/0316147 A1* 10/2016 Bernstein ............ G06F 3/04842
2017/0230585 A1 8/2017 Nash et al.
2018/0027177 A1* 1/2018 Lin ....................... G06F 9/4881
348/207.1

FOREIGN PATENT DOCUMENTS

CN 102044175 A 5/2011
CN 108449554 A 8/2018
(Continued)

*Primary Examiner* — Yogesh K Aggarwal

(57) ABSTRACT

This application provides a multi-camera strategy scheduling method and a related device thereof, and relates to the field of multi-camera technologies. The method includes: displaying a preview interface, where the preview interface includes a first control; detecting a first operation on the first control; determining, by a multi-camera strategy scheduling layer based on initial data, a target multi-camera strategy in response to the first operation; and determining, by the multi-camera strategy scheduling layer, a decision instruction based on the initial data and the target multi-camera strategy. This application adds a multi-camera strategy scheduling layer to a hardware abstraction layer to decouple switching and a configuration logic of a plurality of cameras from a hardware platform, thereby facilitating subsequent maintenance and upgrades.

11 Claims, 13 Drawing Sheets

(51) Int. Cl.
H04N 23/667  (2023.01)
H04N 23/69  (2023.01)

(56)     References Cited

FOREIGN PATENT DOCUMENTS

| CN | 110351487 A | 10/2019 |
|----|-------------|---------|
| CN | 110933275 A | 3/2020 |
| CN | 112637507 A | 4/2021 |
| CN | 113473002 A | 10/2021 |
| CN | 113473018 A | 10/2021 |
| CN | 113726954 A | 11/2021 |
| CN | 113810598 A | 12/2021 |
| CN | 114092364 A | 2/2022 |
| WO | 2021244295 A1 | 12/2021 |

* cited by examiner (a)                    (b)

100

CONT.
FROM FIG.
9A

10

11

Wide aperture Nightscape
Portrait Photo Video More

TO FIG.
9C

CONT. FROM

CONT.
FROM FIG.
9C

MULTI-CAMERA STRATEGY SCHEDULING METHOD AND RELATED DEVICE THEREOF

CROSS-REFERENCE TO RELATED APPLICATIONS

This application is a national stage of International Application No. PCT/CN2022/142843, filed on Dec. 28, 2022, which claims priority to Chinese Patent Application No. 202210193105.8, filed on Feb. 28, 2022. The disclosures of both of the aforementioned applications are hereby incorporated by reference in their entireties.

TECHNICAL FIELD

This application relates to the field of multi-camera technologies, and in particular, to a multi-camera strategy scheduling method and a related device thereof.

BACKGROUND

With the evolution of terminal services on electronic devices, to pursue better photographing effects, installing a plurality of cameras on an electronic device has become a booming trend. By installing the plurality of cameras on the electronic device, more photographing modes may be provided for users to choose and use.

However, the current service related to the plurality of cameras is closely related to a hardware platform on the electronic device, resulting in the functional iteration of the plurality of cameras needing to adapt to the hardware platform. In this way, many problems are caused. For example, switching and configuration logic of the plurality of cameras is highly coupled with the hardware platform. When the hardware platform changes, the switching and configuration logic of the plurality of cameras also need to be changed accordingly. In addition, as there are more adaptation solutions for the plurality of cameras, the switching and configuration logic of the plurality of cameras becomes more complex, which brings huge difficulties to subsequent maintenance and upgrades.

SUMMARY

This application provides a multi-camera strategy scheduling method and a related device thereof, by adding a multi-camera strategy scheduling layer to a hardware abstraction layer to decouple switching and configuration logic of a plurality of cameras from a hardware platform, to facilitate subsequent maintenance and upgrades.

To achieve the foregoing objective, the following technical solutions are used in this application:

According to a first aspect, a multi-camera strategy scheduling method is provided, and is applied to an electronic device including a multi-camera strategy scheduling layer and a plurality of cameras. The method includes:

displaying a preview interface, where the preview interface includes a first control;

detecting a first operation on the first control;

determining, by the multi-camera strategy scheduling layer based on initial data, a target multi-camera strategy in response to the first operation; and determining, by the multi-camera strategy scheduling layer, a decision instruction based on the initial data and the target multi-camera strategy, where the decision instruction is used for controlling working states of the plurality of cameras.

Embodiments of this application provide a multi-camera scheduling method. By adding a multi-camera strategy scheduling layer integrating a plurality of multi-camera switching and configuration strategies in a hardware abstraction layer of an electronic device, multi-camera scheduling may be decoupled from a chip platform, and a multi-camera strategy in the multi-camera strategy scheduling layer is configured and changed more flexibly and conveniently, to meet more photographing requirements.

In a possible implementation of the first aspect, the multi-camera strategy scheduling layer includes an interface adaptation module, a multi-camera strategy selection module, a multi-camera strategy calculation module, and a state-switch decision module that are sequentially connected to each other, and the interface adaptation module is further connected to the state-switch decision module; and the method includes:

the interface adaptation module receives the initial data, where the initial data includes: at least one of a target photographing mode, a zoom ratio, a zoom switch manner, working states of the plurality of cameras at the last moment, a lighting value, a dynamic range value, and an object distance;

the multi-camera strategy selection module determines, based on the initial data, the target multi-camera strategy from a plurality of multi-camera strategies or a plurality of sub-strategies included in each multi-camera strategy, where the target multi-camera strategy is one of the plurality of multi-camera strategies or the plurality of sub-strategies;

the multi-camera strategy calculation module calculates output configuration based on the initial data and the target multi-camera strategy, where the output configuration indicates working states of the plurality of cameras at the next moment, and a working state of each camera includes: turning off, transmission to foreground for display, and running at background;

the state-switch decision module determines the decision instruction based on the initial data and the output configuration; and the interface adaptation module outputs the decision instruction.

In this implementation, by using the interface adaptation module, differences in chip platforms may be managed together and input and output may be adapted to adapt different hardware chip platforms. In addition, a new multi-camera strategy architecture may be formed based on the multi-camera strategy selection module, multi-camera strategy calculation module and state-switch decision module, all functions are integrated into the multi-camera strategy scheduling layer, and only different multi-camera polices need to be called and switched according to different requests.

In a possible implementation of the first aspect, the multi-camera strategy scheduling layer further includes a first conversion module and a second conversion module, the first conversion module is connected between the interface adaptation module and the multi-camera strategy selection module, and the second conversion module is connected between the state-switch decision module and the interface adaptation module:

that after the interface adaptation module receives the initial data, the method further includes:

the first conversion module converts the initial data into first data; and that after the state-switch decision module determines the decision instruction based on the initial data and the output configuration, the method further includes:

the second conversion module converts the decision instruction into second data; and the interface adaptation module outputs the second data.

In this implementation, the first conversion module performs conversion to convert a data format applicable to different platforms into a unified data format applicable to the multi-camera strategy scheduling layer. The second conversion module may convert the data format applicable to the multi-camera strategy scheduling layer into the data format of different platforms. By using conversion functions of the first conversion module and the second conversion module, the multi-camera strategy scheduling layer may support running and change debugging at any time.

In a possible implementation, the target photographing module is one of a wide aperture mode, a nightscape mode, a portrait mode, a photo mode, a video mode, and a high dynamic range mode; and the method further includes:

the multi-camera strategy selection module determines a wide aperture mode sub-strategy as the target multi-camera strategy when the target photographing mode is the wide aperture mode, where the multi-camera strategy includes a user strategy, and the user strategy includes the wide aperture mode sub-strategy, a nightscape mode sub-strategy, a portrait mode sub-strategy, a photo mode sub-strategy, a video mode sub-strategy, a high dynamic range mode sub-strategy;

the multi-camera strategy selection module determines the nightscape mode sub-strategy as the target multi-camera strategy when the target photographing mode is the nightscape mode;

the multi-camera strategy selection module determines the portrait mode sub-strategy as the target multi-camera strategy when the target photographing mode is the portrait mode;

the multi-camera strategy selection module determines the photo mode sub-strategy as the target multi-camera strategy when the target photographing mode is the photo mode;

the multi-camera strategy selection module determines the video mode sub-strategy as the target multi-camera strategy when the target photographing mode is the video mode; and the multi-camera strategy selection module determines the high dynamic range mode sub-strategy as the target multi-camera strategy when the target photographing mode is the high dynamic range mode.

In this implementation, dynamic management may be facilitated by configuring different strategies for different photographing modes. A strategy may be changed and debugged at any time without affecting other strategies.

In a possible implementation of the first aspect, the zoom switch manner includes a tap-to-switch manner; and the method further includes:

the multi-camera strategy selection module determines a tap-to-switch strategy as the target multi-camera strategy when the zoom switch manner is the tap-to-switch manner, where the multi-camera strategy includes the tap-to-switch strategy.

In this implementation, special functions may be easily implemented by configuring separate strategies for special switching manners.

In a possible implementation of the first aspect, the method further includes:

the multi-camera strategy selection module determines a dark light strategy as the target multi-camera strategy when the lighting value in the initial data is less than a preset lighting value threshold, where the multi-camera strategy includes the dark light strategy.

In this implementation, special photographing requirements can be met by configuring separate strategies for special scenarios.

In a possible implementation of the first aspect, the method further includes:

the multi-camera strategy selection module determines a high dynamic range strategy as the target multi-camera strategy when the dynamic range value in the initial data is greater than a preset dynamic range value threshold, where the multi-camera strategy includes the target multi-camera strategy.

In a possible implementation of the first aspect, the multi-camera strategy is an xml format file.

In this implementation, an xml format has flexible and convenient configuration.

According to a second aspect, an electronic device is provided, including a processor and a memory.

The memory is configured to store a computer program executable on the processor.

The processor is configured to perform the multi-camera strategy scheduling method according to the first aspect or any possible implementations of the first aspect.

According to a third aspect, a chip is provided, including: a processor, configured to invoke a computer program from a memory and run the computer program to enable a device equipped with the chip to perform the multi-camera strategy scheduling method according to the first aspect or any possible implementations of the first aspect.

According to a fourth aspect, a computer-readable storage medium is provided. The computer-readable storage medium stores a computer program. The computer program includes program instructions, and when the program instructions are executed by a processor, the processor is enabled to perform the multi-camera strategy scheduling method according to the first aspect or any possible implementations of the first aspect.

According to a fifth aspect, a computer program product is provided. The computer program product includes a computer-readable storage medium storing a computer program, and the computer program enables a computer to perform the multi-camera strategy scheduling method according to the first aspect or any possible implementations of the first aspect.

For the beneficial effects of the third aspect, the fourth aspect and the fifth aspect, reference may be made to the beneficial effects of the first aspect. Details are not described herein again.

DESCRIPTION OF REFERENCE NUMERALS

Figure 1:
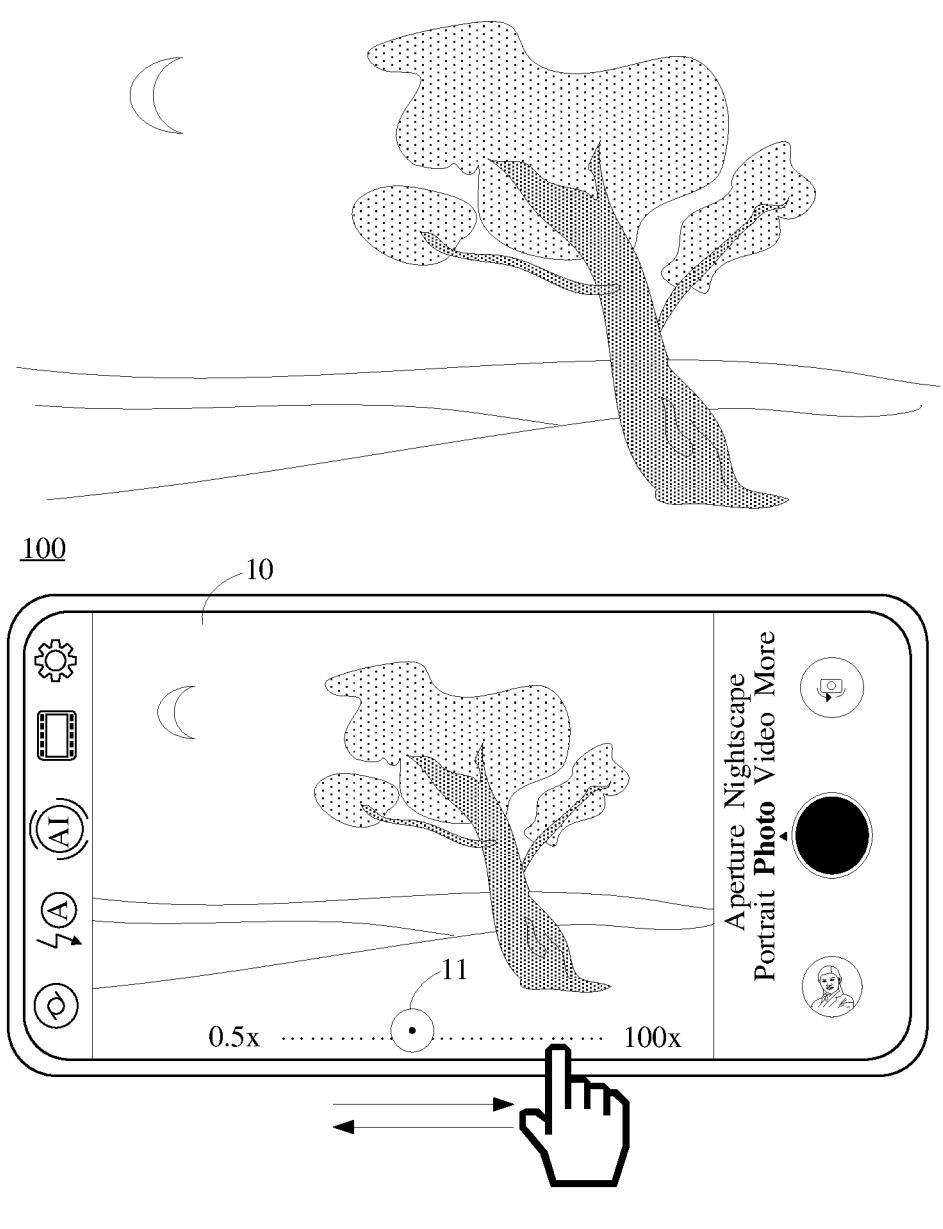
FIG. 1 is a schematic diagram of a scenario applicable to a multi-camera strategy scheduling method according to an embodiment of this application.

131: camera hardware abstraction layer; 1311: interface layer; 1312: media control layer; 132: multi-camera strategy scheduling layer; 1321: interface adaptation module; 1322: multi-camera strategy selection module; 1323: multi-camera strategy calculation module; 1324: state-switch decision module; 1325: first conversion module; 1326: second conversion module

DESCRIPTION OF EMBODIMENTS

The following describes the technical solutions in this application with reference to the accompanying drawings.

In the descriptions of embodiments of this application, "/" means "or" unless otherwise specified. For example, A/B may represent A or B. In this specification, "and/or" describes only an association relationship for describing associated objects and indicates that three relationships may exist. For example, A and/or B may represent the following three cases: Only A exists, both A and B exist, and only B exists. In addition, in the descriptions of embodiments of this application, "a plurality of" refers to two or more.

In the following descriptions, the terms "first" and "second" are used merely for the purpose of description, and shall not be construed as indicating or implying relative importance or implicitly indicating a quantity of indicated technical features. Therefore, features defined with "first" and "second" may explicitly or implicitly include one or more of the features. In the descriptions of embodiments, unless otherwise specified, "a plurality of" means two or more.

Firstly, some terms in embodiments of this application are described for ease of understanding by a person skilled in the art.

1. Focal length, where a size of a focal length marks a magnitude of refractive power, and a smaller focal length indicates greater refractive power. A focal length of an optical lens assembly determines a size of an image generated on an imaging plane by a photographed object captured by the optical lens assembly. Assuming that a same photographed object is photographed at the same distance, a larger focal length of the optical lens assembly indicates greater magnification of an image generated by a photographed object on a charge-coupled device (charge-coupled device, CCD).

2. An optical zoom is mainly a contrast ratio and switching of different focal lengths in a camera module. An optical zoom ratio indicates a capability of the optical zoom. A larger optical zoom ratio indicates that a farther scene can be photographed. An optical zoom ratio is related to a physical focal length of an optical lens assembly. An equivalent focal length of the camera module is often 28 mm to correspond to 1X (namely, 1 time) optical zoom ratio.

3. A field of view (field of view, FOV) indicates a maximum angle range that a camera can capture. If a to-be-photographed object falls within this angle range, the to-be-photographed object may be captured by the camera. If a to-be-photographed object is beyond this angle range, the to-be-photographed object may not be captured by the camera.

Generally, a larger field of view of the camera indicates a larger photographing range and a smaller focal length. However, a smaller field of view of the camera indicates a smaller photographing range and a larger focal length. Therefore, cameras may be classified into a main camera, a wide-angle camera, and a telephoto camera due to different fields of view. A field of view of the wide-angle camera is larger than a field of view of the main camera, a focal length of the wide-angle camera is smaller than a field of view of the main camera, and the wide-angle camera is suitable for close-range photography. However, a field of view of the telephoto camera is smaller than a field of view of the main camera, a focal length of the telephoto camera is larger than a field of view of the main camera, and the telephoto camera is suitable long-range photography.

4. lighting value (lighting value, LV) value is used for estimating ambient luminance, and a specific calculation formula thereof is as follows:

$$LV = 10 \times \log_2\left(\frac{\text{Aperture}^2}{\text{Exposure}} \times \frac{100}{ISO} \times \frac{\text{Luma}}{46}\right)$$

Exposure is exposure time, Aperture is an aperture size, ISO is light sensitivity, and Luma is an average value of Y in an XYZ color space.

5. dynamic range (dynamic range) indicates proportion information of an over-exposure region in a preview image obtained by a camera to an entire image.

The foregoing is a brief description of the terms included in embodiments of this application. Details are not described below.

Because in conventional technologies, switching and configuration logic of a plurality of cameras is highly coupled with a hardware platform, and when the hardware platform changes, the switching and configuration logic of the plurality of cameras also need to be changed accordingly and are complex to change. In addition, as there are more adaptation solutions for the plurality of cameras, the switching and configuration logic of the plurality of cameras becomes more complex, which brings huge difficulties to subsequent maintenance and upgrades.

In view of this, embodiments of this application provide a multi-camera strategy scheduling method. By integrating the switching and configuration strategies needed by multi-camera scheduling into one module, the scheduling of the plurality of cameras may be decoupled from a hardware platform, which is no longer limited by the hardware platform and may be more independent. In addition, the scheduling of the plurality of cameras may be changed and set more flexibly, scheduling of one camera may not affect other cameras, and management may be made more dynamically.

The multi-camera strategy scheduling method provided in embodiments of this application may be applied to the photographing field. For example, the method may be applied to image photography or video recording.

A scenario applicable to a multi-camera strategy scheduling method provided in embodiments of this application is introduced below. An example in which an electronic device 100 is a mobile phone is used for description.

There are a plurality of cameras on the mobile phone. For example, there are four cameras. The four cameras are a wide-angle camera, a main camera, a black and white camera, and a telephoto camera, respectively. The four cameras are used to photograph a same to-be-photographed scene.

Certainly, the electronic device 100 may also include other cameras. The types of cameras and a quantity of each type of camera may be set as required. This is not limited in embodiments of this application. For example, the electronic device 100 has four cameras. The four cameras may be an ultra-wide-angle camera, a wide-angle camera, a black and white camera, and a telephoto camera.

It should be understood that generally zoom ratio ranges of the main camera and the black and white camera are basically the same, while a zoom ratio corresponding to the wide-angle camera is smaller than a zoom ratio of the main camera, and a zoom ratio of the telephoto camera is larger than the zoom ratio of the main camera. A zoom ratio refers to a capability of an optical zoom of a camera.

For example, a zoom ratio range corresponding to the wide-angle camera is [0.1, 1), a zoom ratio range corresponding to the main camera is [1, 3.9), a zoom ratio range corresponding to the black and white camera is [1, 2), and a zoom ratio range corresponding to the telephoto camera is [3.9, 100). 0.1 refers to 0.1 times zoom ratio, that is, 0.1×: 1 refers to 1 time zoom ratio, that is, 1×: 2 refers to 2 times zoom ratio, that is, 2×: 3.9 refers to 3.9 times zoom ratio, that is, 3.9×; and 100 refers to 100 times zoom ratio, that is, 100×.

Application Scenario 1

FIG. 1 is a schematic diagram of an application scenario applicable to a multi-camera strategy scheduling method according to an embodiment of this application.

As shown in FIG. 1, in response to an operation of a user, a mobile phone may start a camera application, and display a graphical user interface (graphical user interface, GUI) shown in FIG. 1. The GUI interface may be referred to as a preview interface 10. The preview interface includes a viewfinder window, a plurality of photographing mode options, and a first control. The viewfinder window may be configured to display a preview image in real time. A plurality of photographing modes include such as a wide aperture mode, a nightscape mode, a portrait mode, a photo mode, and a video mode. The first control is, for example, a zoom slide 11. A user may choose a currently needed zoom ratio in the zoom slide 11, such as a zoom ratio of 0.5 times, 2 times, or 50 times.

The user increases the zoom ratio through a sliding operation, and a photographed object may be continuously enlarged in the viewfinder window. Through the sliding operation to reduce the zoom ratio, the photographed object may be continuously reduced in the viewfinder window. In this way, the user may adjust the preview image displayed in the viewfinder window by choosing the zoom ratio.

For example, as shown in FIG. 1, when the user wants to take photos of grass and trees outdoors, the user opens a camera application, a default zoom ratio of a preview interface is 1 time, and a camera called by the mobile phone is a main camera. In this case, the user wants to further enlarge a part of the picture where the trees are located and photograph the trees more clearly. Therefore, the user performs a sliding operation on the zoom slide on the preview interface. For example, a current zoom ratio is changed to 10 times. In response to the sliding operation, the camera called by the mobile phone is switched to a telephoto camera. In this scenario, when the zoom ratio is changed from 1 to 10 times, the mobile phone needs to determine whether to switch the camera and how to switch the camera, a program corresponding to the multi-camera strategy scheduling method provided in embodiments of this application may be run.

Application Scenario 2

Figure 2:
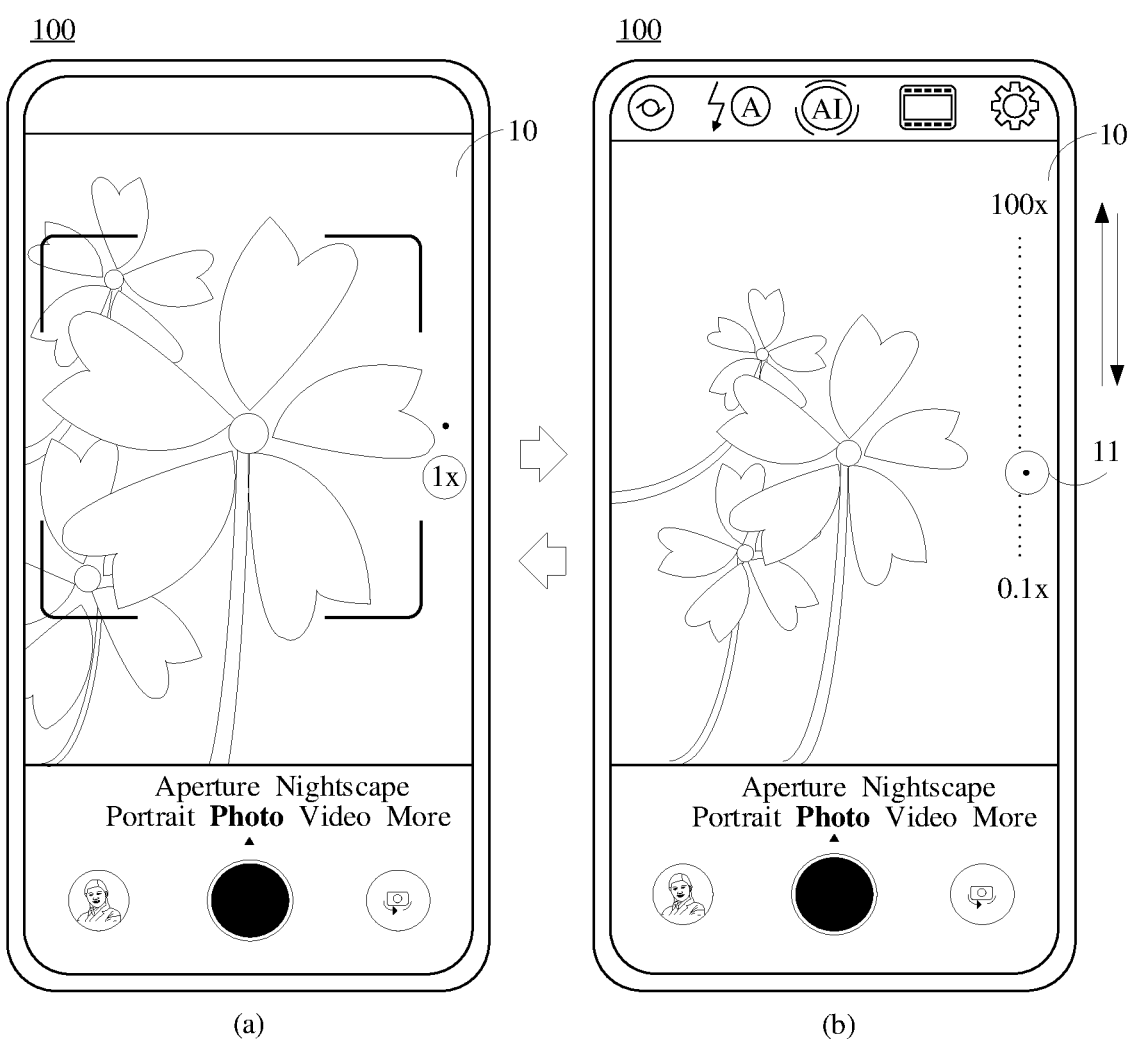
FIG. 2 is a schematic diagram of another scenario applicable to a multi-camera strategy scheduling method according to an embodiment of this application.

FIG. 2 is another application scenario applicable to a multi-camera strategy scheduling method according to an embodiment of this application.

As shown in FIG. 2, in response to an operation of a user, a mobile phone may start a camera application, and display a preview interface 10 shown in (a) in FIG. 2. The preview interface includes a viewfinder window, a plurality of photographing mode options, and a first control.

When the user approaches a photographed object holding the mobile phone, and the mobile phone detects that an area proportion of a photographed object in a certain picture in a viewfinder window is greater than a first preset proportion, a zoom ratio is increased, and then the mobile phone chooses, based on the zoom ratio, not to switch or to switch the camera. When the user is far away from the photographed object holding the mobile phone, and the mobile phone detects that an area proportion of a photographed object in a certain picture in the viewfinder window is less than a second preset proportion, the zoom ratio is decreased, and then the mobile phone chooses, based on the zoom ratio, not to switch or to switch the camera. Therefore, the mobile phone automatically changes the zoom ratio and switches the camera by identifying an area proportion of the photographed object, to adjust the preview image displayed in the viewfinder window.

For example, as shown in (a) in FIG. 2, when the user is preparing to take a photo of a bunch of flowers in the garden, the user opens the camera application, the default zoom ratio of the preview interface is 1 time, and a camera called by the mobile phone is the main camera. In this case, the user points the mobile phone at a certain flower and keeps the mobile phone close to the location of the flower. Because an area proportion of the flower in the viewfinder window is greater than 50%, the mobile phone may automatically increase the zoom ratio. For example, the zoom ratio is changed to 2 times. In this case, the main camera is still called, and the picture in the viewfinder window is shown in (b) in FIG. 2. If the user keeps the mobile phone away from the location of the flower, because the area proportion of the flower in the viewfinder window is less than 10%, the mobile phone may automatically reduce the zoom ratio, for example, the zoom ratio is changed to 0.5 times, and the called camera is switched from the main camera to a wide-angle camera. In this scenario, when the zoom ratio is changed from 1 time to 2 times, and the camera is unchanged, and when the zoom ratio is changed from 2 times to 0.5 times, and the camera is switched from the main camera to the wide-angle camera, the program corresponding to the multi-camera strategy scheduling method provided in embodiments of this application may be run.

It should be understood that the foregoing is an example of describing the application scenarios, and does not limit the application scenarios of this application.

For ease of understanding of the multi-camera strategy scheduling method according to embodiments of this application, the following first introduces a software system of an electronic device 100. The software system of the electronic device 100 may use a layered architecture, an event-driven architecture, a microkernel architecture, a microservice architecture, or a cloud architecture. It should be noted that, in embodiments of this application, an operating system (operating system, OS) of the electronic device may include, but is not limited to, Symbian® (Symbian), Android® (Android), Windows®, iOS® (iOS), Blackberry® (Blackberry), HarmonyOS (HarmonyOS), and the like. This is not limited in this application.

Figure 3:
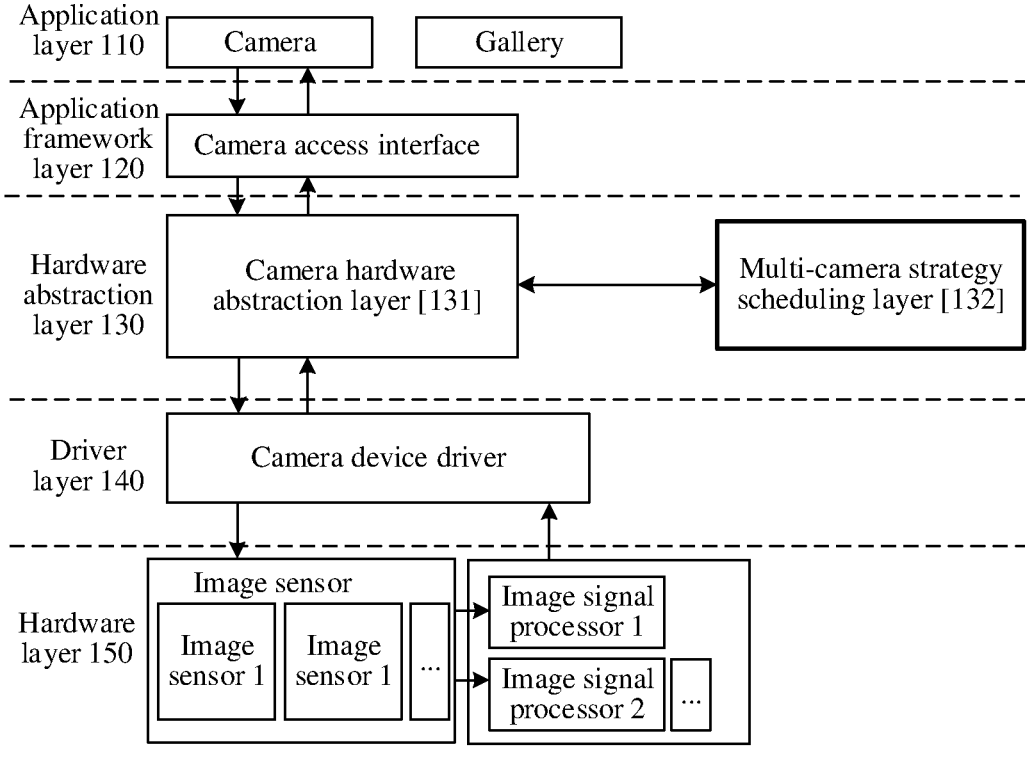
FIG. 3 is a schematic diagram of a structure of a software system of an electronic device according to an embodiment of this application.

In this embodiment of this application, the software structure of the electronic device 100 is described by using an Android system with a layered architecture as an example. FIG. 3 is a block diagram of a software structure of the electronic device 100 according to an embodiment of this application.

As shown in FIG. 3, the layered architecture divides software into several layers, and each layer has a clear role and task. Layers communicate with each other through a software interface. In some implementations, the Android system is divided into five layers: an application (APP) layer 110, an application framework layer 120, a hardware abstraction layer (hardware abstract layer, HAL) 130, a driver layer 140, and a hardware layer 150 from top to bottom.

As shown in FIG. 3, the application layer 110 may include a series of application packages. For example, the application layer 110 may include applications such as a camera, and a gallery.

The application layer 110 is at the top of the whole framework and bears a responsibility of interacting directly with a user. Once a direct or indirect requirement of the user such as taking photos or recording videos is received, the application layer 110 sends the requirement to the application framework layer 120 through an interface, and waits for the application framework layer 120 to return a processing result. The result includes image data, camera parameters, and the like. Then the application layer 110 feeds back the result to the user.

The application framework layer 120 locates between the application layer 110 and the hardware abstraction layer 130. The application framework layer 120 provides an application programming interface (application programming interface, API) and a programming framework for the applications of the application layer 110. The application framework layer 120 includes some predefined functions.

The application framework layer 120 is a framework of the application. Developers can develop some applications based on the application framework layer 120 while following development principles of the application framework. In addition, the application framework layer 120 also includes an access interface corresponding to a camera application, and the like.

The hardware abstraction layer 130 is configured to perform hardware abstraction, to provide a virtual hardware usage platform for an operating system. Specifically combined with the solutions of this application, for example, the hardware abstraction layer 130 may include a camera hardware abstraction layer 131, and the like.

The driver layer 140 is configured to provide a driver for different hardware devices. For example, the driver layer 140 may include a camera device driver.

The hardware layer 150 may include an image sensor (sensor), an image signal processor, and another hardware device. This is not limited in this application.

In this application, a connection between the application program layer 110 and the application framework layer 120 above the hardware abstraction layer 130 and the driver layer 140 and the hardware layer 150 below the hardware abstraction layer may be implemented by calling the camera hardware abstraction layer 131 in the hardware abstraction layer 130, to implement camera data transmission and function control.

On this basis, a multi-camera strategy scheduling layer 132 is added in a hardware abstraction layer 130. By connecting to a camera hardware abstraction layer 131, multi-camera switching and configuration logic may be customized in the multi-camera strategy scheduling layer 132, and different functions can be customized according to different requirements. The multi-camera strategy scheduling layer 132 may obtain various parameters through the camera hardware abstraction layer 131, and call various hardware such as a sensor and an ISP to implement switching and configuration between a plurality of cameras.

Figure 4:
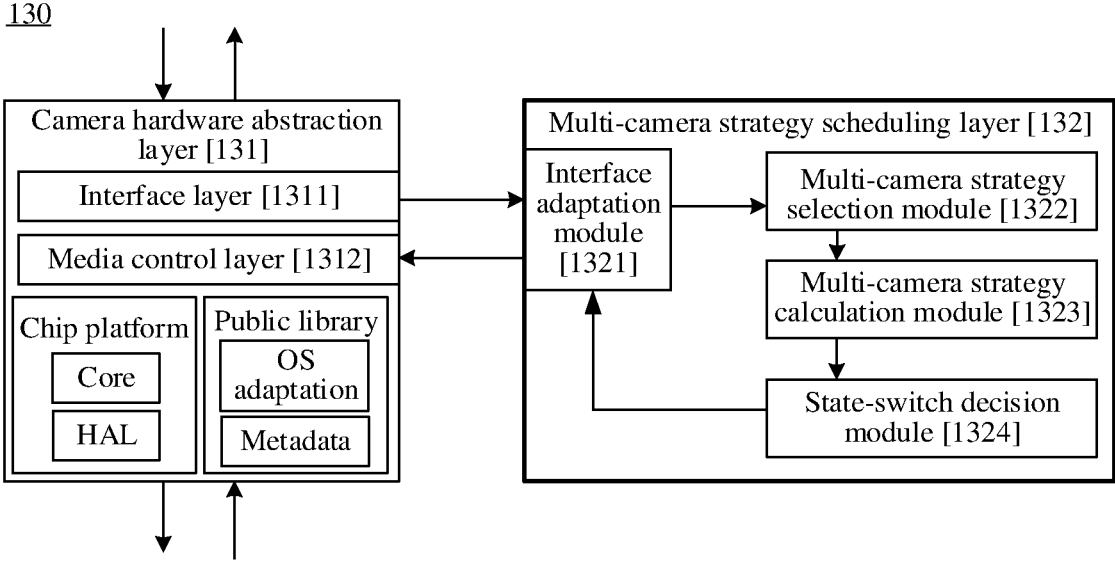
FIG. 4 is a schematic diagram of a structure of a hardware abstraction layer according to an embodiment of this application.
Figure 5:
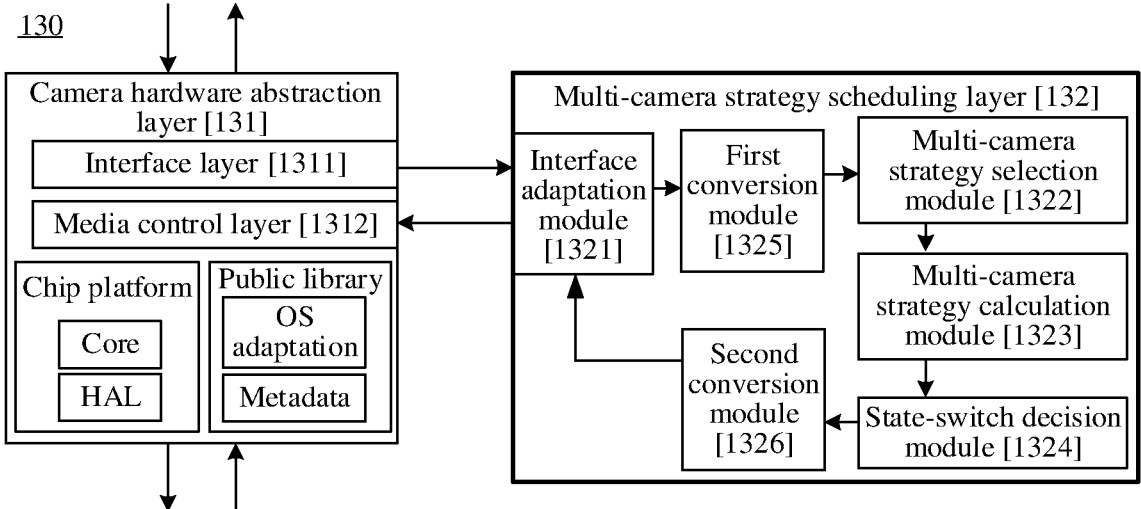
FIG. 5 is a schematic diagram of another structure of a hardware abstraction layer according to an embodiment of this application.

Refer to FIG. 4 and FIG. 5. FIG. 4 is a schematic diagram of a structure of the hardware abstraction layer 130 according to an embodiment of this application. FIG. 5 is a schematic diagram of another structure of the hardware abstraction layer 130 according to an embodiment of this application.

As shown in FIG. 4 and FIG. 5, in some embodiments, the camera hardware abstraction layer 131 includes an interface layer 1311 having a general function. The interface layer 1311 is configured to access different operating systems to achieve management and control.

The camera hardware abstraction layer 131 further includes a media control layer 1312, a chip platform (Camx), and a public library. The media control layer 1312 is configured to interface with service customization of the chip platform. The chip platform includes a set of code of an interface having a general function. For example, core is configured to store a core implementation module of the chip platform. The public library includes various data such as adaptation data of the operating system and metadata (Metadate).

As shown in FIG. 4, the multi-camera strategy scheduling layer 132 includes an interface adaptation module 1321, a multi-camera strategy selection module 1322, a multi-camera strategy calculation module 1323, and a state-switch decision module 1324 that are sequentially connected to each other.

The interface adaptation module 1321 is further connected to the state-switch decision module 1324 and the camera hardware abstraction layer 131. The interface adaptation module 1321 is configured to receive initial data from the camera hardware abstraction layer 131, and provide the initial data for the multi-camera strategy selection module 1322. The interface adaptation module 1321 is further configured to receive a decision instruction provided by a state-switch module, and provide the decision instruction for the camera hardware abstraction layer 131, so that the camera hardware abstraction layer 131 may perform control based on the decision instruction.

Optionally, as an implementation, the interface adaptation module 1321 is connected to the interface layer 1311 and the media control layer 1312 in the camera hardware abstraction layer 131. The interface adaptation module 1321 is configured to receive initial data from the interface layer 1311 and provide the initial data for the multi-camera strategy selection module 1322. The interface adaptation module 1321 is further configured to receive a decision instruction provided by the state-switch decision module 1324, and provide the decision instruction for the media control layer 1312, so that the media control layer 1312 may perform control based on the decision instruction.

The multi-camera strategy selection module 1322 is configured to determine a corresponding target multi-camera strategy based on the initial data, where the multi-camera strategy selection module 1322 include a plurality of multi-camera strategies, each multi-camera strategy may include a plurality of sub-strategies, and a target multi-camera strategy is any one of the plurality of multi-camera strategies or the plurality of sub-strategies.

The multi-camera strategy calculation module 1323 is configured to calculate, based on the initial data and the target multi-camera strategy, a corresponding output configuration and provide the output configuration for the state-switch decision module 1324.

The state-switch decision module 1324 is configured to determine a decision instruction based on the initial data and the output configuration. The decision instructions indicate the camera hardware abstraction layer 131 to control working states of a plurality of cameras.

In some embodiments, the initial data may include a target photographing mode, a zoom ratio, a zoom switch manner, a working state of a camera at the last moment, an LV value, an object distance, an object value, a DR value, an ISO, and the like.

A photographing mode of an electronic device 100 includes a wide aperture mode, a nightscape mode, a portrait mode, a photo mode, a video mode, an HDR mode, and may also include a micro-distance mode, a smart mode, and the like. Specific settings may be made as required. This is not limited in embodiments of this application. The target photographing mode in the initial data indicates a photographing mode after a user performs a switching operation of a photographing mode, that is, a photographing mode that the user expects to achieve.

It should be understood that the zoom ratio includes a corresponding zoom ratio before the user performs a zoom operation, which is referred to as a first zoom ratio here, and a zoom ratio after the user performs the zoom operation, which is referred to as a second zoom ratio here.

The zoom switch manner refers to an operation manner used when the user changes the zoom ratio, such as a sliding manner or a tap-to-switch manner. The sliding manner means that the user continuously slides on a zoom slide or a position on a display to change the zoom ratio. The tap-to-switch manner means that the user directly taps a zoom ratio value at a position on an interface to change the zoom ratio. The tap-to-switch manner has a discontinuous characteristic that is opposite to a characteristic of the sliding manner.

Working states of cameras indicate whether each of the plurality of cameras is in a turning off state, a transmission to foreground for display state, or a running at background state. The transmission to foreground for display means that the camera collects an image and transmits the image to a preview window of the display for display. The running at background means that the camera collects an image but the image is only used for storing rather than displaying. Each time the hardware layer 150 generates a frame of image, the hardware layer generates and reports the working state of the camera. A latest reported working state of the camera is used as a working state of the camera at the last moment in the initial data.

The object distance refers to a distance in physical space between an electronic device and a to-be-photographed object.

Data such as the photographing mode, the zoom ratio, the zoom switch manner may come from the application layer 110. A real-time state of the camera, the LV value, the object distance, and the like may come from the chip platform, from the hardware abstraction layer 130 or from the hardware layer 150, and certainly may also come from other layers. This is not limited in embodiments of this application.

It should be noted that, the multi-camera strategy selection module 1322 may customize a plurality of multi-camera strategies according to requirements, for example, may include strategy one, strategy two, strategy three, strategy four, strategy five, strategy six, and the like.

For example, the strategy one may be a user strategy. When the electronic device is put into use, the strategy one may be called by default. The user strategy may include a plurality of sub-strategies. For example, based on different photographing modes set, the user strategy may include a wide aperture mode sub-strategy, a nightscape mode sub-strategy, a portrait mode sub-strategy, a photo mode sub-strategy, a video mode sub-strategy, an HDR mode sub-strategy, and the like. Based on each sub-strategy, a corresponding multi-camera switching and configuration scheme may be designed to meet to different photographing requirements.

For example, the strategy two is a tap-to-switch strategy. When the user changes the zoom ratio in a tap manner, the strategy two is determined as a matching target multi-camera strategy, and then a decision instruction is determined based on a scheme of the strategy two.

For example, the strategy three may be a test strategy. When a tester tests the electronic device and the initial data includes a test mark triggered by the tester, the test strategy may be called.

For example, the strategy four may be a dark light strategy. When the electronic device detects that a scene where the electronic device is located is very dark and determines the scene as a dark scene, the strategy four may be determined accordingly as a matching target multi-camera strategy, and then a decision instruction is determined based on a scheme of the strategy four.

For example, the strategy five can be a high dynamic range (high dynamic range, HDR) strategy. When the electronic device determines that a scene where the electronic device is located is an HDR scene based on a dynamic range value, the strategy five may be determined accordingly as a matching target multi-camera strategy, and then a decision instruction is determined based on a scheme of the strategy five.

For example, the multi-camera strategy selection module may also include the strategy six. The strategy six is a high-configuration strategy. Assuming that there are two versions of mobile phones of a same product, for example, an ordinary mobile phone may only configure the user strategy, while a high-configuration mobile phone may add the high-configuration strategy to meet a special photographing requirement of the high-configuration mobile phone. When the strategy six needs to be called, the initial data includes a high-configuration mark automatically triggered by the user or the application layer 110.

The plurality of multi-camera strategies in the multi-camera strategy selection module 1322 may be configured in an XML format, and certainly, may also be configured in other manners. This is not limited in embodiments of this application.

It should be understood that a quantity, content, and a format of the foregoing strategies may be set and changed as required. This is not limited in embodiments of this application.

Optionally, as an implementation, as shown in FIG. 5, the multi-camera strategy scheduling layer 132 further includes a first conversion module 1325 and a second conversion module 1326.

The first conversion module 1325 is connected between the interface adaptation module 1321 and the multi-camera strategy selection module 1322. The first conversion module 1325 is configured to convert initial data received by the interface adaptation module 1321 into first data and input the first data into the multi-camera strategy selection module 1322.

The second conversion module 1326 is connected between the state-switch decision module 1324 and the interface adaptation module 1321. The second conversion module is configured to convert a switching instruction output by the state-switch decision module 1324 into second data and provide the second data for the interface adaptation module 1321 to output.

It should be noted that, the first data needs to be in a format that can be identified and processed by the multi-camera strategy selection module 1322, such as a McxContext format. The second data needs to be in a format that can be identified and processed by the camera hardware abstraction layer 131.

Embodiments of this application provide an electronic device. By adding a multi-camera strategy scheduling layer integrating a plurality of multi-camera switching and configuration strategies in a hardware abstraction layer of the electronic device, multi-camera scheduling may be decoupled from a chip platform, and a multi-camera strategy in the multi-camera strategy scheduling layer is configured and changed more flexibly and conveniently, to meet more photographing requirements.

Figure 6:
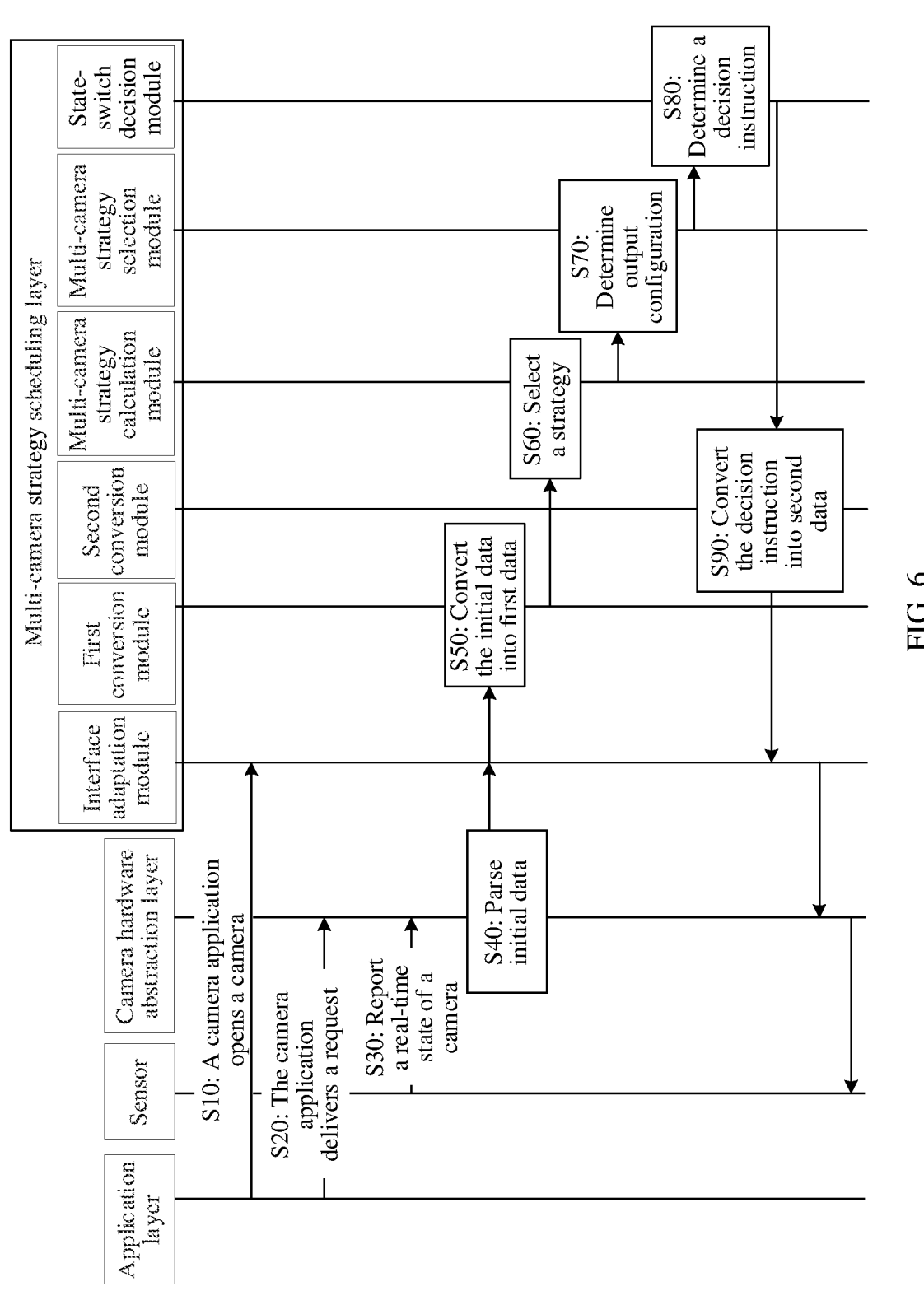
FIG. 6 is a schematic flowchart of a multi-camera strategy scheduling method according to an embodiment of this application.

For the foregoing software structure, correspondingly, embodiments of this application provide a multi-camera scheduling method. FIG. 6 is a schematic flowchart of a multi-camera scheduling method according to an embodiment of this application. As shown in FIG. 6, the method includes the following S10 to S90.

S10: When an icon of a camera application is tapped by a user to trigger, an electronic device 100 starts to run the camera application and calls a multi-camera strategy scheduling layer 132 through a camera hardware abstraction layer 131.

S20: The camera application delivers a request to the camera hardware abstraction layer 131 in response to an operation of the user or a preset trigger condition.

S30: A sensor in a hardware layer 150 reports a working state of a camera to the camera hardware abstraction layer 131.

For example, a working state of each camera may include turning off, transmission to foreground for display, and running at background.

S40: The camera hardware abstraction layer 131 parses corresponding initial data based on a delivered request and a reported working state of the camera.

For example, the initial data may include a photographing mode, a first zoom ratio, a second zoom ratio, a zoom switch manner, the working state of the camera, an LV value, a DR value, and the like.

S50: The camera hardware abstraction layer 131 transmits the initial data to an interface adaptation module 1321 in the multi-camera strategy scheduling layer 132. The interface adaptation module 1321 provides the initial data for a first conversion module 1325. The first conversion module 1325 converts the initial data into first data.

S60: A multi-camera strategy selection module 1322 selects and calls one multi-camera strategy or one sub-strategy based on the first data. The multi-camera strategy or the sub-strategy is a target multi-camera strategy.

S70: A multi-camera strategy calculation module 1323 calculates corresponding output configuration based on the initial data and the target multi-camera strategy.

S80: A state-switch decision module 1324 determines a decision instruction based on the initial data and the output configuration.

S90: A second conversion module 1326 converts the decision instruction into second data, outputs the second data into the camera hardware abstraction layer 131 through the interface adaptation module 1321, and then delivers the second data to the sensor to control a plurality of cameras based on the decision instruction.

Embodiments of this application provide a multi-camera scheduling method. By adding a multi-camera strategy scheduling layer integrating a plurality of multi-camera switching and configuration strategies in a hardware abstraction layer of an electronic device, multi-camera scheduling may be decoupled from a chip platform, and a multi-camera strategy in the multi-camera strategy scheduling layer is configured and changed more flexibly and conveniently, to meet more photographing requirements.

An example in which a working process of the multi-camera strategy scheduling layer 132 is described below with reference to the accompanying drawings is used.

Example 1

Figure 7:
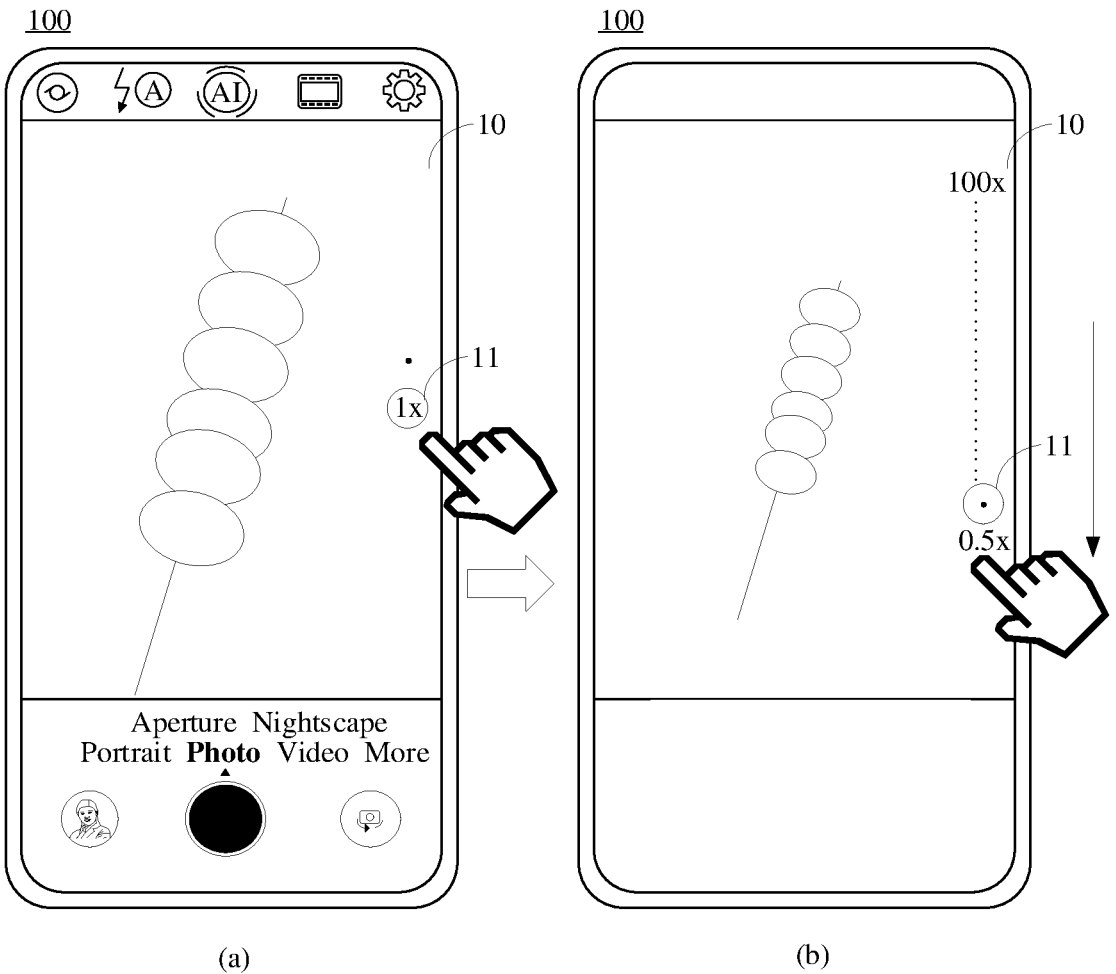
FIG. 7 is a schematic diagram of a preview interface according to an embodiment of this application.

FIG. 7 is a schematic diagram of a preview interface according to an embodiment of this application. An embodiment of this application provides a multi-camera strategy scheduling method, including the following S101 to S108.

S101: A camera application in an application layer 110 is displayed on a screen of an electronic device 100 in a form of an icon. When an icon of the camera application is tapped by a user to trigger, the electronic device 100 starts to run the camera application.

S102: When the camera application runs on the electronic device 100, the camera application calls a camera access interface corresponding to the camera application in an application framework layer 120, and calls the multi-camera strategy scheduling layer 132 through a camera hardware abstraction layer 131. The multi-camera strategy scheduling layer 132 performs related initialization, loads a related configuration file, and loads and parses a multi-camera strategy related file.

After the multi-camera strategy scheduling layer 132 is initialized, for example, as shown in (a) in FIG. 7, the camera hardware abstraction layer 131 may control the preview interface to display that a current photographing mode is a photo mode, the zoom ratio is 1 time, a main camera is called to collect at a certain working frequency, and a collected image is transmitted to a viewfinder window for display.

S103: As shown in (b) in FIG. 7, if the user slides a zoom slide on the preview interface and changes the current zoom ratio on the preview interface from 1× to 0.5×, in response to this operation, the camera application calls the camera access interface to deliver a first request. After the camera hardware abstraction layer 131 receives the first request, data issued by an upper application layer 110 and image data returned by a lower hardware layer 150 is parsed to obtain initial data. For example, the initial data includes: A target photographing mode is the photo mode, a first zoom ratio is 1×, a second zoom ratio is 0.5×, a zoom switch manner is a sliding manner, working states of cameras at the last moment are that the main camera performs transmission to foreground for display, and other cameras are turned off. In addition, the initial data also includes an LV value and the like.

S104: The camera hardware abstraction layer 131 transmits the initial data to an interface adaptation module 1321 in the multi-camera strategy scheduling layer 132 through an interface layer 1311. The interface adaptation module 1321 provides the initial data for a first conversion module 1325. The first conversion module 1325 converts the initial data into first data.

S105: A multi-camera strategy selection module 1322 selects and calls, based on the first data, a configuration file corresponding to the photo mode sub-strategy in strategy one. In this case, a photo mode sub-strategy in strategy one is a target multi-camera strategy.

S106: A multi-camera strategy calculation module 1323 calculates corresponding output configuration based on the initial data and the photo mode sub-strategy.

For example, a rule of the photo mode sub-strategy is that a zoom ratio range corresponding to a wide-angle camera is [0.1, 1), and a zoom ratio range corresponding to the main camera is [1, 3.9). When the zoom ratio changes from 1× to 0.5×, a corresponding zoom ratio range changes from [1, 3.9) to [0.1, 1). In this case, the main camera is not turned off and only runs at background. A collected image is only for storing and is not displayed, while the wide-angle camera starts running, collects an image, and displays a collected image in the viewfinder window.

Therefore, the multi-camera strategy calculation module 1323 may calculate that 0.5× is in the zoom ratio range of [0.1, 1), so that the output configuration determined in this case is: The wide-angle camera performs transmission to foreground for display, the main camera runs at background, and a zoom ratio is 0.5×.

S107: A state-switch decision module 1324 determines, based on the initial data and the output configuration, that a decision instruction as "the working state of the main camera is switched from transmission to foreground for display to running at background, the working state of the wide-angle camera is switched from turning off to transmission to foreground for display, and the zoom ratio is switched from 1× to 0.5×".

If the main camera and the wide-angle camera in a configuration file have corresponding numbers, the main camera and the wide-angle camera may be expressed in a form of numbers.

S108: A second conversion module 1326 converts the decision instruction into second data and outputs the second data into a media control layer 1312 of the camera hardware abstraction layer 131. The media control layer 1312 fills the second data into the first request, and then the first request is delivered to a driver layer 140 by a chip platform to control a plurality of cameras based on the decision instruction, so that at the next moment the working state of the main camera is switched from transmission to foreground for display to running at background, the working state of the wide-angle camera is switched from turning off to transmission to foreground for display, and the zoom ratio is switched from 1× to 0.5×.

The foregoing process is only an example, and the sequence may be specifically adjusted as required. Certainly, steps may also be added or reduced. This is not limited in embodiments of this application.

Example 2

Figure 8:
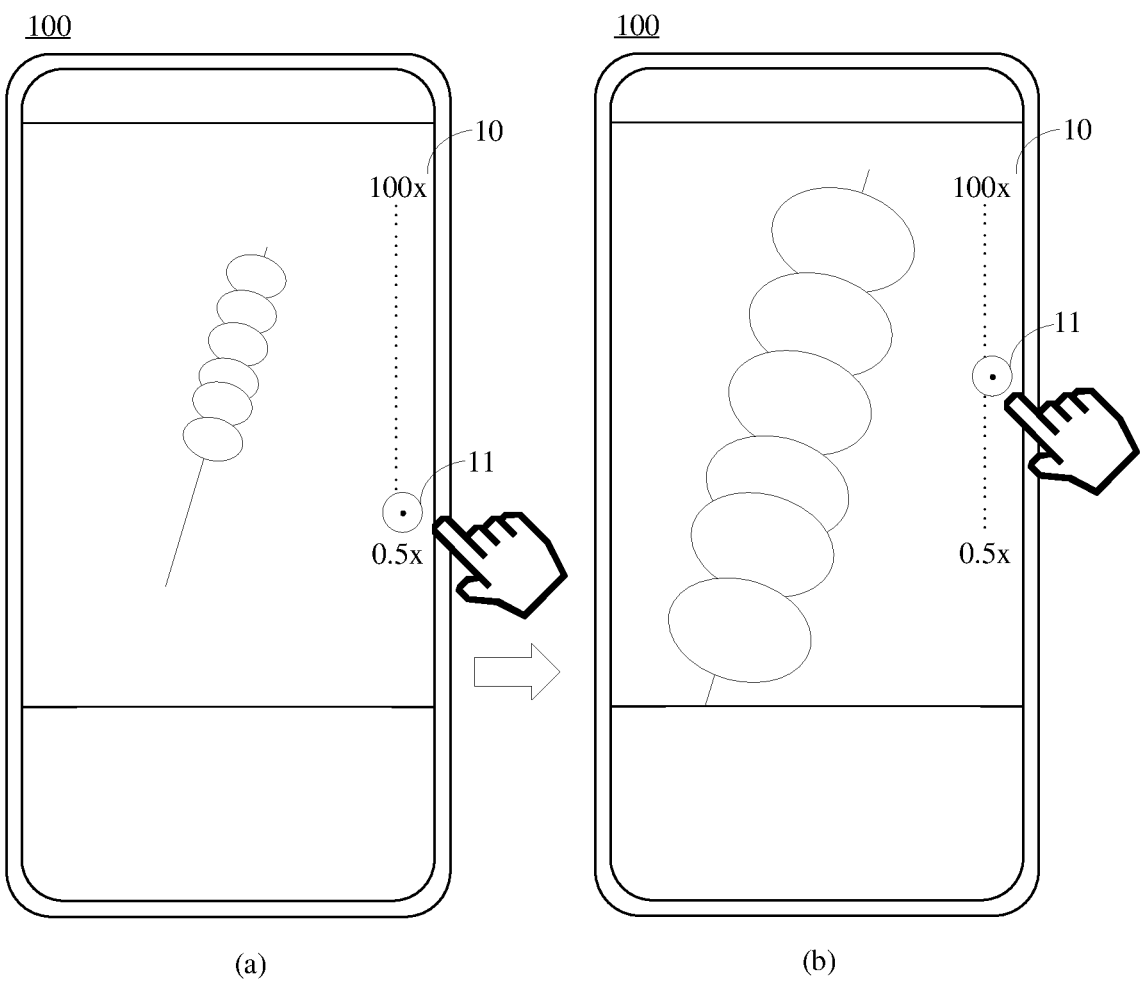
FIG. 8 is a schematic diagram of another preview interface according to an embodiment of this application.

FIG. 8 is a schematic diagram of another preview interface according to an embodiment of this application. An embodiment of this application provides a multi-camera strategy scheduling method, including the following S111 to S119.

S111: As shown in (a) in FIG. 8, if a user slides a zoom slide to 0.5× on a preview interface and then continues to operate the zoom slide, as shown in (b) in FIG. 8, the user changes a current zoom ratio on the preview interface from 0.5× to 8× in a tap manner. In response to this operation, a camera application calls a camera access interface to deliver a second request. After a camera hardware abstraction layer 131 receives the second request, data delivered by an upper application layer 110 and image data returned by a lower hardware layer 150 is parsed to obtain initial data. For example, the initial data includes: A target photographing mode is a photo mode, a first zoom ratio is 0.5×, a second zoom ratio is 8×, a zoom switch manner is a tap-to-switch manner, and a working state of a camera at the last moment is that a main camera runs at background, a wide-angle camera is in transmission to foreground for display, and other cameras are turned off. In addition, the initial data also includes an LV value and the like.

S112: The camera hardware abstraction layer 131 transmits the initial data to an interface adaptation module 1321 in the multi-camera strategy scheduling layer 132 through an interface layer 1311. The interface adaptation module 1321 provides the initial data for a first conversion module 1325. The first conversion module 1325 converts the initial data into first data.

S113: Because switching included in the initial data is a tap-to-switch manner, a multi-camera strategy selection module 1322 preferentially selects and calls a configuration file corresponding to strategy two. In this case, strategy two or the tap-to-switch strategy is a target multi-camera strategy.

This means that strategy two has a higher priority than strategy one. When the initial data satisfies the condition of strategy two, strategy two is preferentially selected.

S114: A multi-camera strategy calculation module 1323 calculates corresponding output configuration based on the initial data and the tap-to-switch strategy.

For example, a rule of the tap-to-switch strategy is that a zoom ratio range corresponding to the wide-angle camera is [0.1, 1), a zoom ratio range corresponding to the main camera is [1, 3.9), and a zoom ratio range corresponding to a black and white camera is [1, 2), and a zoom ratio range corresponding to a telephoto camera is [3.9, 100). To make transition of a viewfinder window smoother and improve visual effect of the user, the zoom is executed in segments and switched sequentially based on the foregoing zoom ratio ranges during implementation.

When a zoom ratio is expected to change from 0.5× to 8×, a corresponding zoom ratio range may actually change from [0.1, 1) to [1, 3.9), and then from [1, 3.9) to [3.9, 100). To avoid frame freezing in foreground display and make switching smoother, the multi-camera strategy scheduling layer 132 may complete a large zoom change by a plurality of operations.

For example, the multi-camera strategy calculation module 1323 may divide this operation into four times to complete, and recalculate next output configuration after each operation ends, where the zoom ratio changes from 0.5× to 1× in the first operation, and corresponding output configuration is: The wide-angle camera is turned off, the main camera is in transmission to foreground for display, and the zoom ratio is 1×.

The zoom ratio changes from 1× to 2× in the second operation, and corresponding output configuration is: The main camera is in transmission to foreground for display, the black and white camera runs at background, and the zoom ratio is 2×.

The zoom ratio changes from 2× to 3.9× in the third operation, and corresponding output configuration is: The main camera is in transmission to foreground for display, the black and white camera is turned off, the telephoto camera runs at background, and the zoom ratio is 3.9×.

The zoom ratio changes from 3.9× to 8× in the fourth operation, and corresponding output configuration is: The main camera runs at background, the telephoto camera is in transmission to foreground for display, and the zoom ratio is 8×.

S115: A state-switch decision module 1324 determines, based on the initial data and the output configuration, a decision instruction corresponding to the first operation as "the working state of the wide-angle camera is switched from running at foreground to turning off, the working state of the main camera is switched from running at background to transmission to foreground for display, and the zoom ratio is switched from 0.5× to 1×".

S116: A second conversion module 1326 converts the decision instruction into second data and outputs the second data into a media control layer 1312 of the camera hardware abstraction layer 131. The media control layer 1312 fills the second data into a first request, and then the first request is delivered to a driver layer 140 by a chip platform to control a plurality of cameras based on the decision instruction, so that the working state of the wide-angle camera is switched from transmission to foreground for display to turning off, the working state of the main camera is switched from transmission to background for display to transmission to foreground for display, and the zoom ratio is switched from 0.5× to 1×.

S117: Repeat S112 to S114, and update the first data. The state-switch decision module 1324 determines, based on output configuration corresponding to the second operation calculated by the multi-camera strategy calculation module 1323, a decision instruction corresponding to the second operation as "the main camera remains unchanged and keeps to be in transmission to foreground for display, the working state of the black and white camera is switched from turning off to running at background, and the zoom ratio is 2×". The media control layer 1312 controls the camera based on the second data corresponding to the decision instruction.

S118: Repeat S112 to S114, and update the first data. The state-switch decision module 1324 determines, based on output configuration corresponding to the third operation calculated by the multi-camera strategy calculation module 1323, a decision instruction corresponding to the third operation as "the main camera remains unchanged and keeps to be in transmission to foreground for display, the working state of the black and white camera is switched from running at background to turning off, the working state of the telephoto camera is switched from turning off to running at background, and the zoom ratio is 3.9×". The media control layer 1312 controls the camera based on the second data corresponding to the decision instruction.

S119: Repeat 112 to S114, and update the first data. The state-switch decision module 1324 determines, based on output configuration corresponding to the fourth operation calculated by the multi-camera strategy calculation module 1323, a decision instruction corresponding to the fourth operation as "the working state of the main camera is switched from transmission to foreground for display to running at background, and the working state of telephoto camera is switched from running at background to transmission to foreground for display, and the zoom ratio is 8×". The media control layer 1312 controls the camera based on the second data corresponding to the decision instruction.

Therefore, through a plurality of cycles of use, smooth switching from 0.5× to 8× may be achieved to improve visual experience of a user. Certainly, the multi-camera strategy calculation module 1323 may decompose the switching process into more operations. A calculation rule may be specifically set and changed as required. This is not limited in embodiments of this application.

It should be noted that, after the zoom ratio is switched to 8×, execution of the tap-to-switch strategy in the multi-camera strategy scheduling layer 132 ends, and the photo mode sub-strategy of strategy one may be automatically switched back.

The foregoing process is only an example, and the sequence may be specifically adjusted as required. Certainly, steps may also be added or reduced. This is not limited in embodiments of this application.

Example 3

FIG. 9 is a schematic diagram of a preview interface according to an embodiment of this application. An embodiment of this application provides a multi-camera strategy scheduling method, including the following S121 to S128.

Figure 9A:
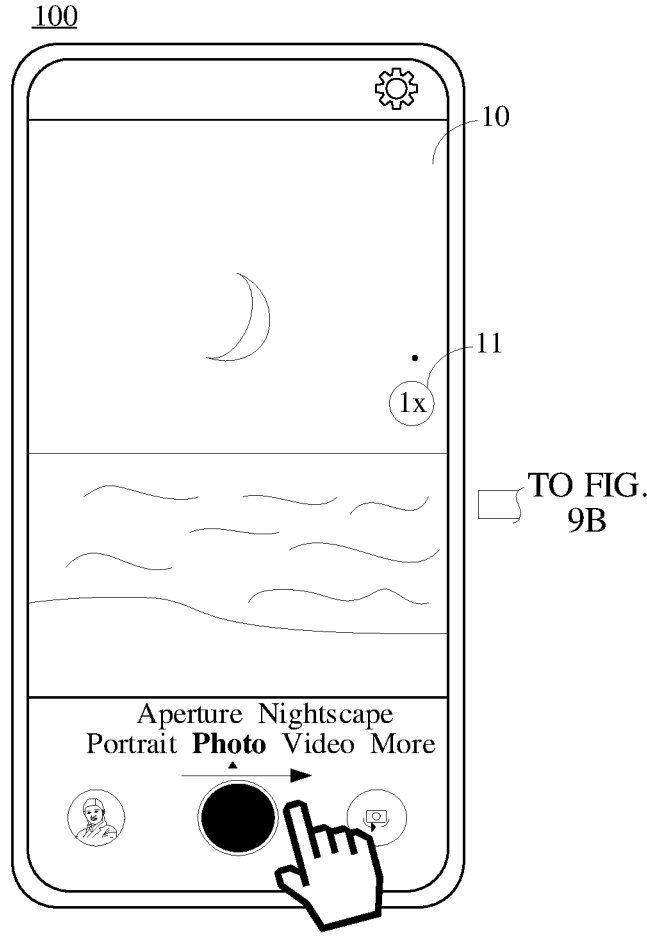
FIGS. 9A-9D are schematic diagrams of still another preview interface according to an embodiment of this application.

S121: As shown in FIG. 9A, a camera application in an application layer 110 is displayed on a screen of an electronic device 100 in a form of an icon. When an icon of the camera application is tapped by a user to trigger, the electronic device 100 starts to run the camera application.

S122: When the camera application runs on the electronic device 100, the camera application calls a camera access interface corresponding to a camera application in an application framework layer 120, and calls the multi-camera strategy scheduling layer 132 through a camera hardware abstraction layer 131. The multi-camera strategy scheduling layer 132 performs related initialization, loads a related configuration file, and loads and parses a multi-camera strategy related file.

After the multi-camera strategy scheduling layer 132 is initialized, for example, the camera hardware abstraction layer 131 may control a preview interface to display a current photographing mode as a photo mode, a zoom ratio is 1 time, a main camera is called to collect at a certain working frequency, and a collected image is transmitted to a viewfinder window for display.

Figure 9B:
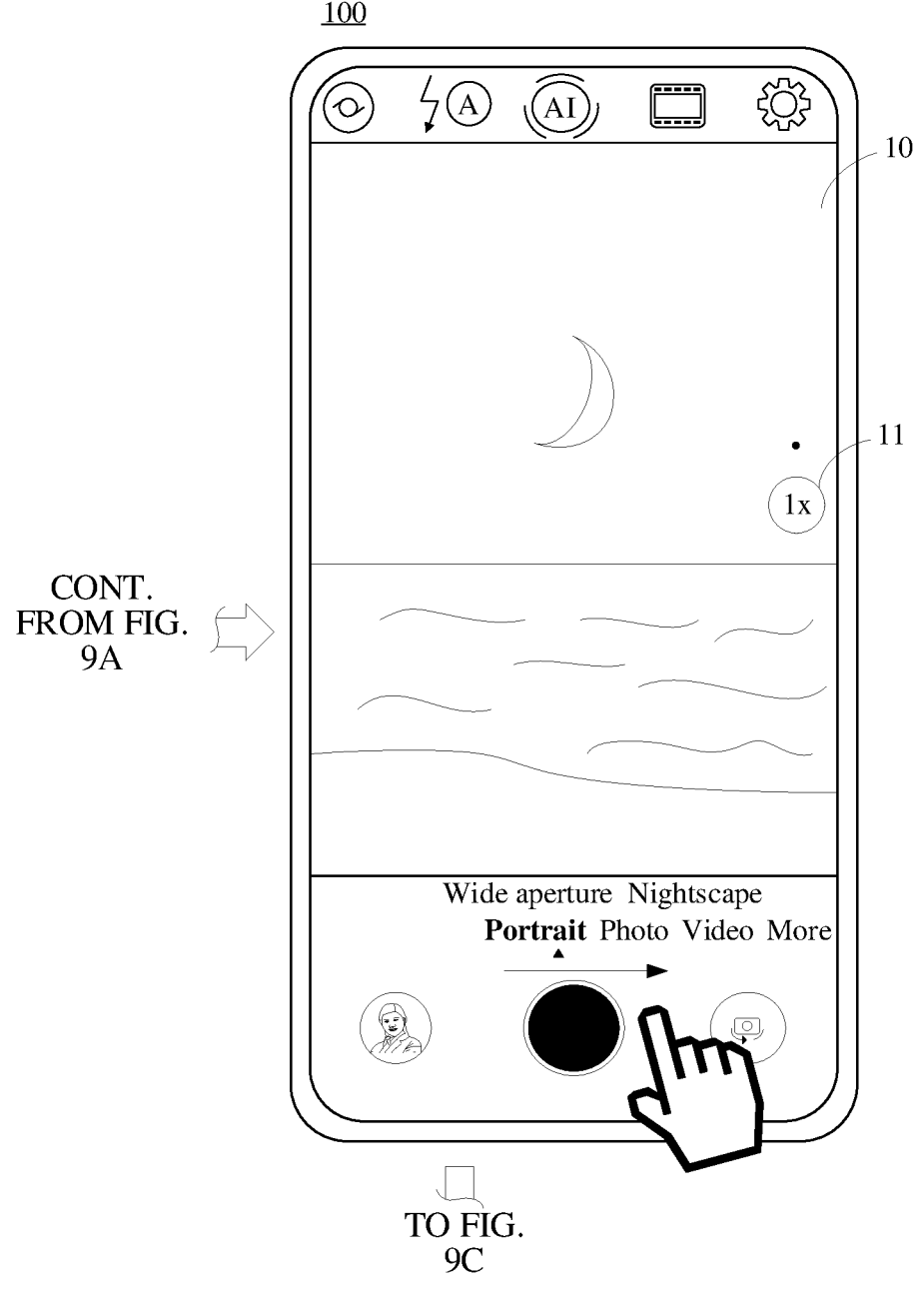

S123: As shown in FIG. 9B, if the user slides the photographing mode on the preview interface, the current photographing mode indicated by a photographing key on the preview interface is changed from the photo mode to a portrait mode. In response to this operation, the camera application calls the camera access interface to deliver a third request. After the camera hardware abstraction layer 131 receives the third request, data delivered by an upper application layer 110 and image data returned by a lower hardware layer 150 is parsed to obtain initial data. For example, the initial data includes: A target photographing mode is the portrait mode, a zoom ratio is 1 time, and working states of cameras at the last moment are that the main camera is in transmission to foreground for display, and other cameras are turned off. In addition, the initial data also includes an LV value and the like.

S124: The camera hardware abstraction layer 131 transmits the initial data to an interface adaptation module 1321 in the multi-camera strategy scheduling layer 132 through an interface layer 1311. The interface adaptation module 1321 provides the initial data for a first conversion module 1325, and the first conversion module 1325 converts the initial data into first data. The multi-camera strategy selection module 1322 selects and calls, based on the first data, a configuration file corresponding to a portrait mode sub-strategy in strategy one. In this case, the portrait mode sub-strategy in strategy one is a target multi-camera strategy. A multi-camera strategy calculation module 1323 calculates corresponding output configuration based on the initial data and the portrait mode sub-strategy. A state-switch decision module 1324 determines a decision instruction based on the initial data and the output configuration. A second conversion module 1326 converts the decision instruction into second data, and outputs the second data into a media control layer 1312 of the camera hardware abstraction layer 131. The media control layer 1312 fills the second data into the third request, and then the third request is delivered to a driver layer 140 by a chip platform to control a plurality of cameras based on the decision instruction.

Figures 9B, 9C:
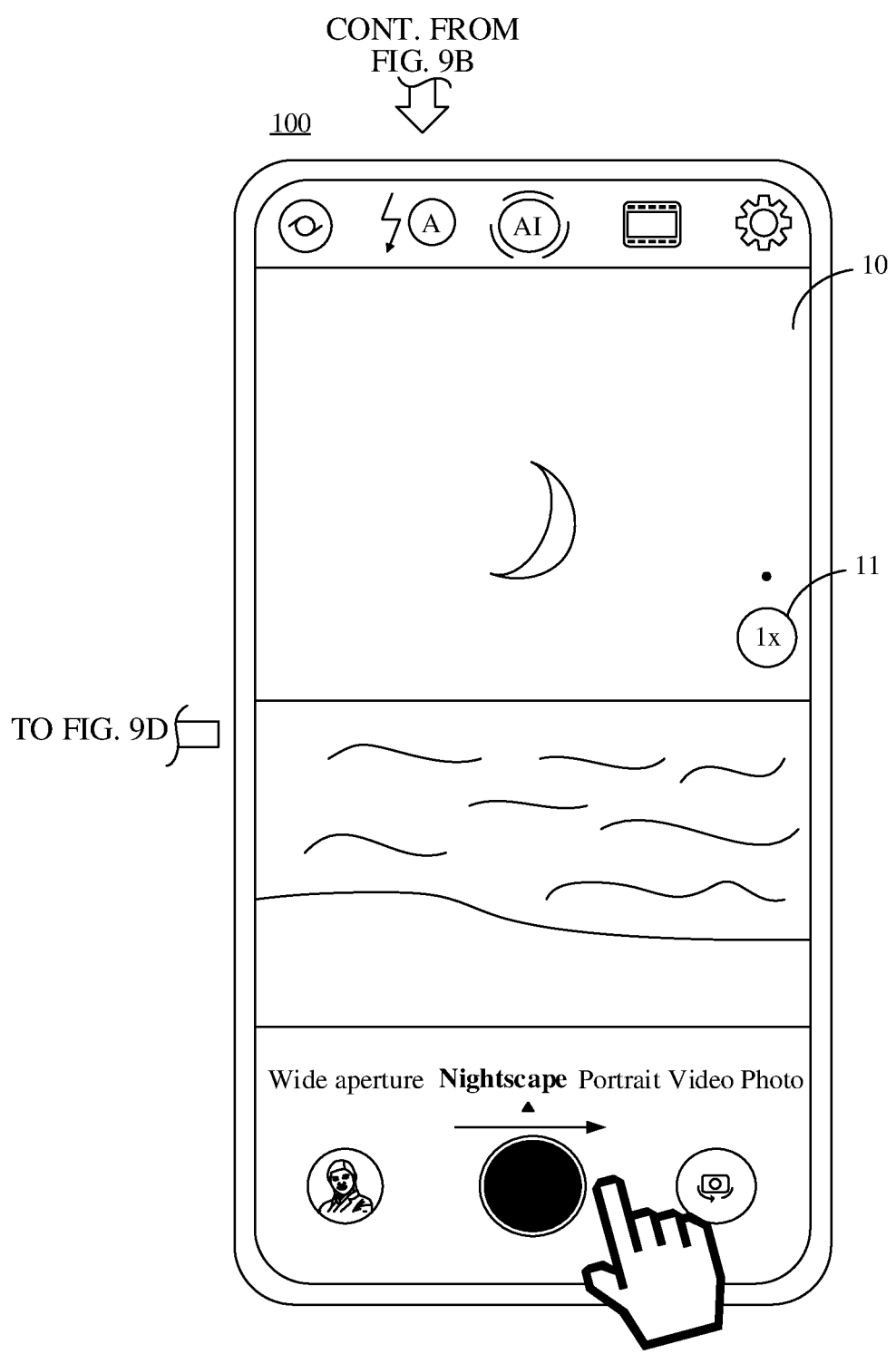

S125: As shown in FIG. 9C, if the user continues to slide the photographing mode on the preview interface, the current photographing mode indicated by the photographing key on the preview interface is changed from the portrait mode to a nightscape mode. In response to this operation, the camera application calls the camera access interface to deliver a fourth request. After the camera hardware abstraction layer 131 receives the fourth request, the data delivered by the upper application layer 110 and the image data returned by the lower hardware layer 150 is parsed to obtain initial data. For example, the initial data includes: The target photographing mode is the nightscape mode, the zoom ratio is 1 time, and the working states of the cameras at the last moment are that the main camera is in transmission to foreground for display, and other cameras are turned off. In addition, the initial data also includes the LV value and the like.

S126: The camera hardware abstraction layer 131 transmits the initial data to the interface adaptation module 1321 in the multi-camera strategy scheduling layer 132 through the interface layer 1311. The interface adaptation module 1321 provides the initial data for the first conversion module 1325, and the first conversion module 1325 converts the initial data into first data. The multi-camera strategy selection module 1322 selects and calls, based on the first data, a configuration file corresponding to the portrait mode sub-strategy in strategy one. In this case, the portrait mode sub-strategy in strategy one is a target multi-camera strategy. The multi-camera strategy calculation module 1323 calculates corresponding output configuration based on the initial data and the portrait mode sub-strategy. The state-switch decision module 1324 determines a decision instruction based on the initial data and the output configuration. The second conversion module 1326 converts the decision instruction into second data, and outputs the second data into the media control layer 1312 of the camera hardware abstraction layer 131. The media control layer 1312 fills the second data into the third request, and then the third request is delivered to the driver layer 140 by the chip platform to control a plurality of cameras based on the decision instruction.

Figure 9D:
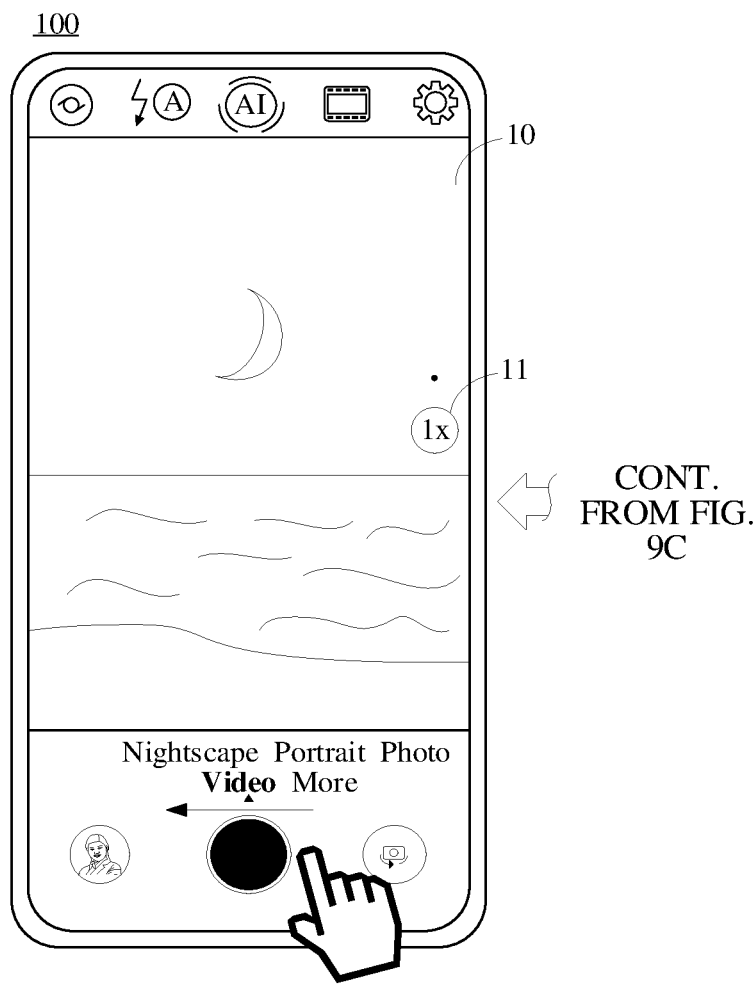

S127: As shown in FIG. 9D, if the user continues to slide the photographing mode on the preview interface, the current photographing mode indicated by the photographing key on the preview interface is changed from the nightscape mode to a video mode. In response to this operation, the camera application calls the camera access interface to deliver a fifth request. After the camera hardware abstraction layer 131 receives the fifth request, the data delivered by the upper application layer 110 and the image data returned by the lower hardware layer 150 is parsed to obtain initial data. For example, the initial data includes: The target photographing mode is the video mode, the zoom ratio is 1 time, and the working states of the cameras at the last moment are that the main camera is in transmission to foreground for display, and other cameras are turned off. In addition, the initial data also includes the LV value and the like.

S128: The camera hardware abstraction layer 131 transmits the initial data to the interface adaptation module 1321 in the multi-camera strategy scheduling layer 132 through the interface layer 1311. The interface adaptation module 1321 provides the initial data for the first conversion module 1325, and the first conversion module 1325 converts the initial data into first data. The multi-camera strategy selection module 1322 selects and calls, based on the first data, a configuration file corresponding to the portrait mode sub-strategy in strategy one. In this case, the portrait mode sub-strategy in strategy one is a target multi-camera strategy. The multi-camera strategy calculation module 1323 calculates corresponding output configuration based on the initial data and the portrait mode sub-strategy. The state-switch decision module 1324 determines a decision instruction based on the initial data and the output configuration. The second conversion module 1326 converts the decision instruction into second data, and outputs the second data into the media control layer 1312 of the camera hardware abstraction layer 131. The media control layer 1312 fills the second data into the third request, and then the third request is delivered to the driver layer 140 by the chip platform to control a plurality of cameras based on the decision instruction.

The foregoing process is only an example, and the sequence may be specifically adjusted as required. Certainly, steps may also be added or reduced. This is not limited in embodiments of this application.

Example 4

An embodiment of this application further provides a multi-camera strategy scheduling method, including the following S131 to S140.

S131: A camera application in an application layer 110 is displayed on a screen of an electronic device 100 in a form of an icon. When an icon of the camera application is tapped by a user to trigger, the electronic device 100 starts to run the camera application.

S132: When the camera application runs on the electronic device 100, the camera application calls a camera access interface corresponding to the camera application in an application framework layer 120, and calls the multi-camera strategy scheduling layer 132 through a camera hardware abstraction layer 131. The multi-camera strategy scheduling layer 132 performs related initialization, loads a related configuration file, and loads and parses a multi-camera strategy related file.

After the multi-camera strategy scheduling layer 132 is initialized, for example, the camera hardware abstraction layer 131 may control a preview interface to display a current photographing mode as a photo mode, a zoom ratio is 1 time, a main camera is called to collect at a certain working frequency, and a collected image is transmitted to a viewfinder window for display.

S133: Assuming that the user moves to a dark room, that is, in a dark light scene, an LV value in initial data parsed by the camera hardware abstraction layer 131 is very small. In addition, the initial data also includes that a target photographing mode is the photo mode, a zoom ratio is 1× and is not changed, and working states of cameras at the last moment are that a main camera performs transmission to foreground for display, and other cameras are turned off.

S134: The camera hardware abstraction layer 131 transmits the initial data to an interface adaptation module 1321 in the multi-camera strategy scheduling layer 132 through an interface layer 1311. The interface adaptation module 1321 provides the initial data for a first conversion module 1325, and the first conversion module 1325 converts the initial data into first data.

S135: Because the LV value in the initial data is very small, and is less than a preset lighting value threshold, a multi-camera strategy selection module 1322 may select and call strategy four based on the first data, that is, a configuration file corresponding to the dark light strategy. In this case, strategy four is a target multi-camera strategy.

S136: A multi-camera strategy calculation module 1323 calculates, based on the initial data and the dark light strategy, corresponding output configuration. A state-switch decision module 1324 determines a decision instruction based on the initial data and the output configuration. A second conversion module 1326 converts the decision instruction into second data, and outputs the second data into a media control layer 1312 of the camera hardware abstraction layer 131. The media control layer 1312 delivers the second data. Then, the second data is delivered to a driver layer 140 by the chip platform to control a plurality of cameras based on the decision instruction.

S137: Assuming that the user then moves to a scene where dark light in some regions are very dark and bright light in some regions are very bright, that is, in an HDR scene, a DR value in the initial data parsed by the camera hardware abstraction layer 131 is very large. In addition, the initial data also includes that a target photographing mode is the photo mode, a zoom ratio is 1× and is not changed, and working states of cameras at the last moment are that a main camera performs transmission to foreground for display, and other cameras are turned off.

S138: The camera hardware abstraction layer 131 transmits the initial data to the interface adaptation module 1321 in the multi-camera strategy scheduling layer 132 through the interface layer 1311. The interface adaptation module 1321 provides the initial data for the first conversion module 1325, and the first conversion module 1325 converts the initial data into first data.

S139: Because the DR value in the initial data is very large, and is greater than a preset dynamic range value threshold, the multi-camera strategy selection module 1322 may select and call strategy five based on the first data, that is, a configuration file corresponding to the high dynamic range strategy. In this case, strategy five is a target multi-camera strategy.

S140: The multi-camera strategy calculation module 1323 calculates corresponding output configuration based on the initial data and the high dynamic range strategy. The state-switch decision module 1324 determines a decision instruction based on the initial data and the output configuration. The second conversion module 1326 converts the decision instruction into second data, and outputs the second data into the media control layer 1312 of the camera hardware abstraction layer 131. The media control layer 1312 delivers the second data. Then, the second data is delivered to the driver layer 140 by the chip platform to control a plurality of cameras based on the decision instruction.

The foregoing process is only an example, and the sequence may be specifically adjusted as required. Certainly, steps may also be added or reduced. This is not limited in embodiments of this application.

The multi-camera strategy scheduling method and the related display interface provided in embodiments of this application are described above in detail with reference to FIG. 1 to FIG. 9. An electronic device and a chip provided in embodiments of this application are described below in detail with reference to FIG. 10 and FIG. 11. It should be understood that the electronic device and the chip in embodiments of this application may perform the various multi-camera strategy scheduling methods in the foregoing embodiments of this application. To be specific, specific work processes of following products may refer to corresponding processes in the foregoing method embodiments.

Figure 10:
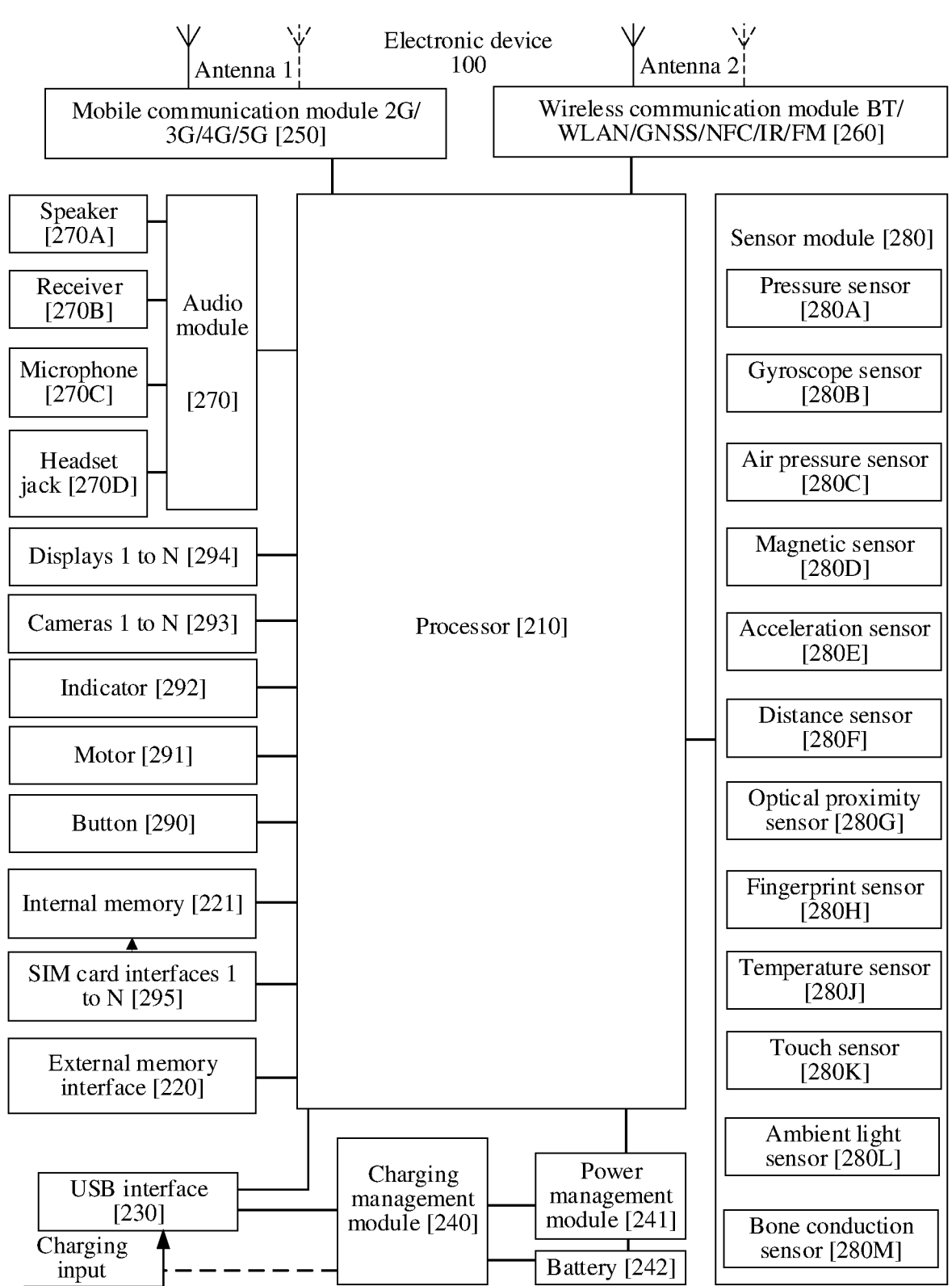
FIG. 10 is a schematic diagram of a structure of a hardware system of an electronic device according to an embodiment of this application.

FIG. 10 shows a hardware system of an electronic device applicable to this application. The electronic device 100 may be configured to implement the multi-camera strategy scheduling method in the foregoing method embodiments.

The electronic device 100 may be a mobile phone, a smart screen, a tablet computer, a wearable electronic device, a vehicle-mounted electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, or the like. A specific type of the electronic device 100 is not limited in this embodiment of this application.

The electronic device 100 may include a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a telephone receiver 270B, a microphone 270C, a headset jack 270D, a sensor module 280, a button 290, a motor 291, an indicator 292, a camera 293, a display 294, a subscriber identification module (subscriber identification module, SIM) card interface 295, and the like. The sensor module 280 may include a pressure sensor 280A, a gyroscope sensor 280B, an air pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

It should be noted that, the structure shown in FIG. 10 does not constitute a specific limitation to the electronic device 100. In some other embodiments of this application, the electronic device 100 may include more or fewer components than those shown in FIG. 10, or the electronic device 100 may include a combination of some of the components shown in FIG. 10, or the electronic device 100 may include sub-components of some of the components shown in FIG. 10. The components shown in FIG. 10 may be implemented by hardware, software, or a combination of software and hardware.

The processor 210 may include one or more processing units. For example, the processor 210 may include at least one of the following processing units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and a neural-network processing unit (neural-network processing unit, NPU). Different processing units may be independent devices or an integrated device.

The controller may be a nerve center and a command center of the electronic device 100. The controller may generate an operation control signal based on instruction operation code and a timing signal, to control instruction fetching and instruction execution.

A memory may be further disposed in the processor 210 to store instructions and data. In some embodiments, the memory in the processor 210 is a cache. The memory may store instructions or data recently used or cyclically used by the processor 210. If the processor 210 needs to use the instructions or data again, the processor may directly invoke the instructions or data from the memory. This avoids repeated access and reduces waiting time of the processor 210, thereby improving system efficiency.

In an embodiment of this application, the processor 210 may perform the following operations: displaying a preview interface, where the preview interface includes a first control: detecting a first operation on the first control: determining, based on initial data, a target multi-camera strategy in response to the first operation; and then determining a decision instruction based on the initial data and the target multi-camera strategy.

A connection relationship among modules shown in FIG. 10 is only a schematic description, which does not constitute limitations on the connection relationship among the modules of the electronic device 100. Optionally, modules of the electronic device 100 may alternatively use a combination of a plurality of connections in the foregoing embodiments.

A wireless communication function of the electronic device 100 may be implemented by using devices such as the antenna 1, the antenna 2, the mobile communication module 250, the wireless communication module 260, the modem processor, and the baseband processor.

The antenna 1 and the antenna 2 are configured to transmit and receive electromagnetic wave signals. Each antenna in the electronic device 100 may be configured to cover one or more communication frequency bands. Different antennas may further be reused to improve antenna utilization. For example, the antenna 1 may be reused as a diversity antenna of a wireless local area network. In some other embodiments, the antenna may be used in combination with a tuning switch.

The electronic device 100 may implement a display function through the GPU, the display 294, and the application processor. The GPU is a microprocessor for image processing and connects the display 294 and the application processor. The GPU is configured to perform mathematical and geometric calculations for graphics rendering. The processor 210 may include one or more GPUs to execute program instructions to generate or change display information.

The display 294 may be configured to display an image or a video.

The electronic device 100 may implement a photographing function through the ISP, the camera 293, the video codec, the GPU, the display 294, the application processor, and the like.

The ISP is configured to process data fed back by the camera 293. For example, during photographing, a shutter is enabled. Light is transmitted to a camera photosensitive element of through a lens, and an optical signal is converted into an electrical signal. The camera photosensitive element transmits the electrical signal to the ISP for processing, and the electrical signal is converted into an image visible to a naked eye. The ISP may optimize algorithm optimization on noise, lightness, and color of the image, and the ISP may further optimize parameters such as exposure and color temperature of a photographing scene. In some embodiments, the ISP may be disposed in the camera 293.

The camera 293 is configured to capture a static image or a video. An optical image is generated for an object by using the lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in formats such as standard red green blue (red green blue, RGB) and YUV. In some embodiments, the electronic device 100 may include one or N cameras 293, and N is a positive integer greater than one.

The digital signal processor is configured to process a digital signal, and may further process another digital signal in addition to the digital image signal. For example, when the electronic device 100 performs a frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG) 1, MPEG 2, MPEG 3, and MPEG 4.

An embodiment of this application may further provide a computer-readable storage medium. The computer-readable storage medium stores computer program instructions. When the computer-readable storage medium runs on the electronic device 100, the electronic device 100 is enabled to perform the foregoing multi-camera strategy scheduling method.

The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium, or a semiconductor medium (for example, a solid state disk (solid state disk, SSD)), or the like.

An embodiment of this application further provides a computer program product including computer instructions. When the computer program product runs on the electronic device 100, the electronic device 100 may be enabled to perform the foregoing multi-camera strategy scheduling method.

Figure 11:
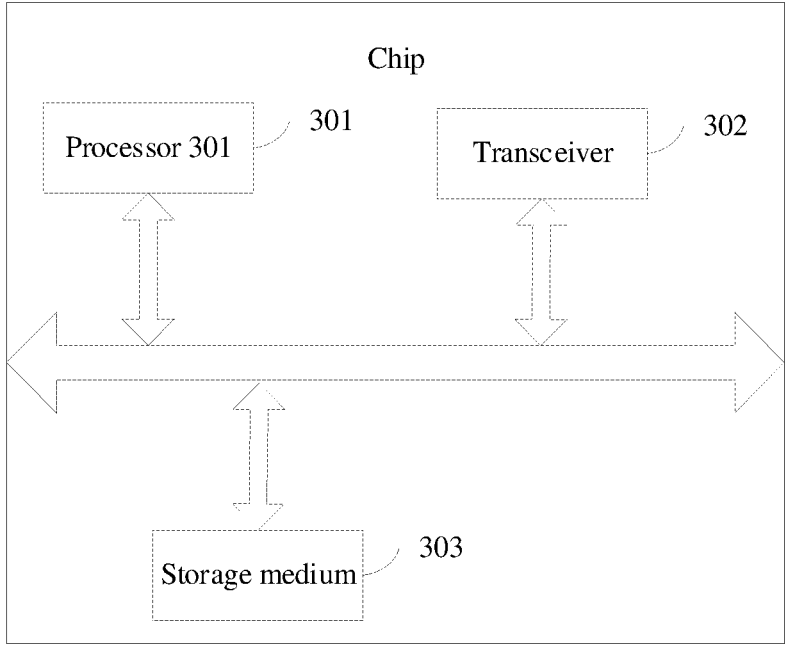
FIG. 11 is a schematic diagram of a structure of a chip according to an embodiment of this application.

FIG. 11 is a schematic diagram of a structure of a chip according to an embodiment of this application. The chip shown in FIG. 11 may be a general-purpose processor and may also be a special-purpose processor. The chip includes a processor 301. The processor 301 is configured to support the electronic device 100 to execute the foregoing technical solutions.

Optionally, the chip further includes a transceiver 302. The transceiver 302 is configured to be controlled by the processor 301 to support the electronic device 100 to execute the foregoing technical solutions.

Optionally, the chip shown in FIG. 11 may further include a storage medium 303.

It should be noted that, the chip shown in FIG. 11 may be implemented by using the following circuits or devices: one or more field programmable gate arrays (field programmable gate array, FPGA), programmable logic devices (programmable logic device, PLD), controllers, state machines, gate logics, discrete hardware components, any other suitable circuits, or any combination of circuits capable of executing various functions described in this whole application.

The electronic device, the computer storage medium, the computer program product, and the chip provided in embodiments of this application are all configured to perform the method provided above. Therefore, beneficial effects achieved by the computer storage medium, the computer program product, and the chip provided in embodiments of this application may refer to beneficial effects corresponding to the method provided above. Details are not described herein again.

It should be understood that the foregoing descriptions are intended to help a person skilled in the art to better understand embodiments of this application, but not to limit the scope of embodiments of this application. Apparently, a person skilled in the art may perform various equivalent modifications or changes based on the given examples, for example, some steps in various embodiments of the detection method may not be required or some steps may be newly added. Alternatively, any two or more of the foregoing embodiments may be combined. Such a modified, changed, or combined scheme may also fall within the scope of embodiments of this application.

It should be further understood that the foregoing descriptions of embodiments of this application emphasize differences between embodiments. For the same or similar parts not mentioned, refer to the embodiments. For brevity, details are not described herein again.

It should be further understood that sequence numbers of the foregoing processes do not mean execution sequences, and the execution sequences of the processes shall be determined based on functions and internal logic of the processes, and should not constitute any limitation on implementation processes of embodiments of this application.

It should be further understood that in embodiments of this application, "preset" and "pre-define" may be implemented by pre-storing corresponding code and tables or other manners indicating related information in a device (such as an electronic device). A specific implementation of this application is not limited.

It should be further understood that division of manners, cases, categories, and embodiments in embodiments of this application is merely intended for ease of description, and should not constitute specific limitations. Features in various manners, categories, cases, and embodiments may be combined without contradictions.

It should be further understood that in embodiments of this application, unless otherwise specified and logically conflicted, terms and/or descriptions in different embodiments are consistent and may be referenced by each other. Technical features in different embodiments may be combined according to an internal logical relationship of the technical features to form a new embodiment.

Finally, it should be noted that: the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A multi-camera strategy scheduling method, applied to an electronic device comprising a multi-camera strategy scheduling layer and a plurality of cameras, wherein the method comprises:

displaying a preview interface, wherein the preview interface comprises a first control;

detecting a first operation on the first control;

determining, by the multi-camera strategy scheduling layer based on initial data, a target multi-camera strategy in response to the first operation; and determining, by the multi-camera strategy scheduling layer, a decision instruction based on the initial data and the target multi-camera strategy, wherein the decision instruction is used for controlling working states of the plurality of cameras, wherein the multi-camera strategy scheduling layer comprises an interface adaptation module, a multi-camera strategy selection module, a multi-camera strategy calculation module, and a state-switch decision module that are sequentially connected to each other, and the interface adaptation module is further connected to the state-switch decision module; and the method further comprises;

receiving, by the interface adaptation module, the initial data, wherein the initial data comprises: at least one of a target photographing mode, a zoom ratio, a zoom switch manner, working states of the plurality of cameras at the last moment, a lighting value, a dynamic range value, and an object distance;

determining, by the multi-camera strategy selection module based on the initial data, the target multi-camera strategy from a plurality of multi-camera strategies or a plurality of sub-strategies comprised in each multi-camera strategy, wherein the target multi-camera strategy is one of the plurality of multi-camera strategies or the plurality of sub-strategies;

calculating, by the multi-camera strategy calculation module, output configuration based on the initial data and the target multi-camera strategy, wherein the output configuration indicates working states of the plurality of cameras at a next moment, and a working state of each camera comprises: turning off, transmission to foreground for display, and running at background;

determining, by the state-switch decision module, the decision instruction based on the initial data and the output configuration; and outputting, by the interface adaptation module, the decision instruction.

2. The method according to claim 1, wherein the multi-camera strategy scheduling layer further comprises a first conversion module and a second conversion module, the first conversion module is connected between the interface adaptation module and the multi-camera strategy selection module, and the second conversion module is connected between the state-switch decision module and the interface adaptation module;

after the receiving, by the interface adaptation module, the initial data, the method further comprises:

converting, by the first conversion module, the initial data into first data; and after the determining, by the state-switch decision module, the decision instruction based on the initial data and the output configuration, the method further comprises:

converting, by the second conversion module, the decision instruction into second data; and outputting, by the interface adaptation module, the second data.

3. The method according to claim 1, wherein the target photographing mode is one of a wide aperture mode, a nightscape mode, a portrait mode, a photo mode, a video mode, and a high dynamic range mode; and the method further comprises:

determining, by the multi-camera strategy selection module, a wide aperture mode sub-strategy as the target multi-camera strategy when the target photographing mode is the wide aperture mode, wherein the multi-camera strategy comprises a user strategy, and the user strategy comprises the wide aperture mode sub-strategy, a nightscape mode sub-strategy, a portrait mode sub-strategy, a photo mode sub-strategy, a video mode sub-strategy, a high dynamic range mode sub-strategy;

determining, by the multi-camera strategy selection module, the nightscape mode sub-strategy as the target multi-camera strategy when the target photographing mode is the nightscape mode;

determining, by the multi-camera strategy selection module, the portrait mode sub-strategy as the target multi-camera strategy when the target photographing mode is the portrait mode;

determining, by the multi-camera strategy selection module, the photo mode sub-strategy as the target multi-camera strategy when the target photographing mode is the photo mode;

determining, by the multi-camera strategy selection module, the video mode sub-strategy as the target multi-camera strategy when the target photographing mode is the video mode; and determining, by the multi-camera strategy selection module, the high dynamic range mode sub-strategy as the target multi-camera strategy when the target photographing mode is the high dynamic range mode.

4. The method according to claim 1, wherein the zoom switch manner comprises a tap-to-switch manner; and the method further comprises:

determining, by the multi-camera strategy selection module, a tap-to-switch strategy as the target multi-camera strategy when the zoom switch manner is the tap-to-switch manner, wherein the multi-camera strategy comprises the tap-to-switch strategy.

5. The method according to claim 1, wherein the method further comprises:

determining, by the multi-camera strategy selection module, a dark light strategy as the target multi-camera strategy when the lighting value in the initial data is less than a preset lighting value threshold, wherein the multi-camera strategy comprises the dark light strategy.

6. The method according to claim 1, wherein the method further comprises:

determining, by the multi-camera strategy selection module, a high dynamic range strategy as the target multi-camera strategy when the dynamic range value in the initial data is greater than a preset dynamic range value threshold, wherein the multi-camera strategy comprises the target multi-camera strategy.

7. The method according to claim 1, wherein the multi-camera strategy is an xml format file.

8. An electronic device, comprising a processor and a memory coupled to the processor, wherein the memory stores a computer program that, when executed by the processor, causes the processor to implement an interface adaptation module, a multi-camera strategy selection module, a multi-camera strategy calculation module, and a state-switch decision module, and to perform the method according to claim 1.

9. A chip system, comprising a processor and a memory coupled to the processor, wherein the memory stores instructions that, when executed by the processor, cause the processor to implement an interface adaptation module, a multi-camera strategy selection module, a multi-camera strategy calculation module, and a state-switch decision module, and to perform the method according to claim 1.

10. A multi-camera strategy scheduling method, applied to an electronic device comprising a multi-camera strategy scheduling layer and a plurality of cameras, wherein the method comprises:

displaying a preview interface, wherein the preview interface comprises a first control;

detecting a first operation on the first control;

determining, by the multi-camera strategy scheduling layer based on initial data, a target multi-camera strategy in response to the first operation; and determining, by the multi-camera strategy scheduling layer, a decision instruction based on the initial data and the target multi-camera strategy, wherein the decision instruction is used for controlling working states of the plurality of cameras, wherein the multi-camera strategy scheduling layer is connected to a camera hardware abstraction layer, wherein the camera hardware abstraction layer includes an interface layer, a media control layer and a chip platform, wherein the interface layer is connected to the media control layer for accessing different operating systems, and wherein the media control layer is connected to the chip platform for business customization of the chip platform.

11. The method according to claim 10, wherein an interface adaptation module is connected to the interface layer, wherein the interface adaptation module is used to receive the initial data from the interface layer, wherein the interface adaptation module is connected to the media control layer, wherein the interface adaptation module is used to provide decision-making instructions to the media control layer.

* * * * *